US012580299B2

(12) United States Patent
Kim

(10) Patent No.: US 12,580,299 B2
(45) Date of Patent: Mar. 17, 2026

(54) WAVE ANTENNA AND ELECTRONIC DEVICE INCLUDING THE SAME

(71) Applicant: SAMSUNG ELECTRONICS CO., LTD., Suwon-si (KR)

(72) Inventor: Gidae Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 213 days.

(21) Appl. No.: 18/587,060

(22) Filed: Feb. 26, 2024

(65) Prior Publication Data

US 2024/0195049 A1 Jun. 13, 2024

Related U.S. Application Data

(63) Continuation of application No. PCT/KR2022/013702, filed on Sep. 14, 2022.

(30) Foreign Application Priority Data

Sep. 16, 2021 (KR) ........................ 10-2021-0123754

(51) Int. Cl.
*H01Q 1/24* (2006.01)

(52) U.S. Cl.
CPC .................................. *H01Q 1/243* (2013.01)

(58) Field of Classification Search
CPC ............ H01Q 1/243; H01Q 1/12; H01Q 1/38; H01Q 1/52
See application file for complete search history.

(56) References Cited

U.S. PATENT DOCUMENTS 10,333,195 B2 6/2019 Takahashi et al.
10,636,547 B2 4/2020 Song et al.
10,854,957 B2 12/2020 Moon et al.
2004/0253972 A1 * 12/2004 Iwai ......................... H01Q 9/30 455/90.3

(Continued)

FOREIGN PATENT DOCUMENTS

KR 20180036238 A 4/2018
KR 102043968 B1 * 11/2019 ........... G06F 1/1605

(Continued)

*Primary Examiner* — Dimary S Lopez Cruz
*Assistant Examiner* — Bamidele A Immanuel
(74) *Attorney, Agent, or Firm* — CANTOR COLBURN LLP

(57) ABSTRACT

An electronic device includes a support member and a lateral member extending from the support member and defining a side surface, a circuit board on the support member and including a camera spaced apart from the side surface, a signal-radiating antenna electrically connected to the circuit board, and a flexible circuit board electrically connecting the circuit board to the signal-radiating antenna and including a flexible area and a rigid area. The support member further defines an inclined surface between the side surface and the camera, on which the signal-radiating antenna is disposed, the inclined surface forming a first inclined angle with respect to one surface of the support member, and a flexible circuit board support surface adjacent to the first inclined surface along which a length of the flexible circuit board extends, the flexible circuit board support surface forming a second inclined angle with respect to one surface of the support member.

20 Claims, 32 Drawing Sheets

(56) References Cited

U.S. PATENT DOCUMENTS

| | | | | |
|---|---|---|---|---|
| 2015/0162388 | A1 | 6/2015 | Kim | |
| 2016/0065801 | A1* | 3/2016 | Bae | H04N 23/57 348/376 |
| 2017/0207516 | A1 | 7/2017 | Koo et al. | |
| 2018/0062263 | A1* | 3/2018 | Ueda | H01Q 1/2283 |
| 2019/0081386 | A1* | 3/2019 | Edwards | H01Q 5/328 |
| 2019/0257933 | A1* | 8/2019 | Nath | H01Q 21/064 |
| 2020/0106167 | A1 | 4/2020 | Moon et al. | |
| 2020/0161763 | A1* | 5/2020 | Lee | H01Q 25/00 |
| 2020/0266520 | A1* | 8/2020 | Moon | G06F 1/1637 |
| 2020/0287268 | A1* | 9/2020 | Moon | H01Q 1/2208 |
| 2020/0303808 | A1 | 9/2020 | Jeon et al. | |
| 2021/0014392 | A1* | 1/2021 | Jo | H04N 23/54 |
| 2021/0050664 | A1 | 2/2021 | Lin et al. | |
| 2021/0159599 | A1 | 5/2021 | Park et al. | |
| 2021/0167487 | A1* | 6/2021 | Varma | H01Q 25/005 |
| 2021/0203054 | A1* | 7/2021 | Moon | H01Q 21/062 |
| 2021/0218129 | A1 | 7/2021 | Kim et al. | |
| 2021/0280971 | A1 | 9/2021 | Kim et al. | |
| 2021/0280981 | A1 | 9/2021 | Kim et al. | |
| 2021/0367319 | A1 | 11/2021 | Moon et al. | |
| 2022/0085490 | A1* | 3/2022 | Moon | H01Q 1/243 |
| 2022/0374051 | A1* | 11/2022 | Go | G06F 1/1658 |
| 2023/0101132 | A1 | 3/2023 | Park | |

FOREIGN PATENT DOCUMENTS

| | | | | | |
|---|---|---|---|---|---|
| KR | 20190133961 | A | | 12/2019 | |
| KR | 20200008647 | A | | 1/2020 | |
| KR | 20200023032 | A | | 3/2020 | |
| KR | 20200038034 | A | | 4/2020 | |
| KR | 20200058153 | A | | 5/2020 | |
| KR | 102133452 | B1 | | 7/2020 | |
| KR | 102214353 | B1 | | 2/2021 | |
| KR | 20210063763 | A | | 6/2021 | |
| KR | 20210093198 | A | | 7/2021 | |
| KR | 20220131013 | A | * | 9/2022 | H04M 1/0266 |
| KR | 20230040521 | A | * | 3/2023 | H01Q 1/12 |
| KR | 102865398 | B1 | * | 9/2025 | H04M 1/0277 |

* cited by examiner

WAVE ANTENNA AND ELECTRONIC DEVICE INCLUDING THE SAME

CROSS-REFERENCE TO RELATED APPLICATIONS

This application is a continuation application of International Application No. PCT/KR2022/013702 designating the United States, filed on Sep. 14, 2022, in the Korean Intellectual Property Receiving Office and claiming priority to Korean Patent Application No. 10-2021-0123754, filed on Sep. 16, 2021, in the Korean Intellectual Property Office, the disclosures of which are incorporated by reference herein in their entireties.

BACKGROUND

(1) Field

Various embodiments of the disclosure relate to an antenna module arrangement structure and an electronic device including the same.

(2) Description of the Related Art

In general, an electronic device including a millimeter wave antenna module is capable of ensuring performance by including a plurality of millimeter wave antennas therein. For example, antenna modules may be respectively placed on the side surface of a battery and the side surface of a printed circuit board within an electronic device. An antenna module may be additionally placed on the rear surface and/or the front surface of the printed circuit board.

SUMMARY

An electronic device may include a plurality of antenna modules to ensure radiation performance. Due to the arrangement of multiple antenna modules, it may be difficult to ensure an arrangement space inside the electronic device. In addition, noise may be caused due to an increase in the length of a flexible printed circuit board (FPCB) that connects the plurality of antenna modules to other components.

An electronic device including a millimeter wave antenna module arrangement structure according to various embodiments of the disclosure is capable of improving the radiation performance of an antenna module while ensuring a space in which various components are arranged inside the electronic device.

An electronic device according to an embodiment of the disclosure may include a housing including a first surface, a second surface provided parallel to the first surface, and a side surface surrounding the space defined between the first surface and the second surface, a printed circuit board including a camera module spaced apart from the side surface, a support member having at least one surface on which the printed circuit board is disposed, a flexible printed circuit board (FPCB) including a flexible area and a rigid area, and an antenna module electrically connected to the printed circuit board by using the FPCB. The support member may include a first inclined area where the antenna module is disposed and forms a first inclined angle from one surface of the support member, the first inclined area being provided between the side surface and the camera module, and an FPCB support area which extends in a longitudinal direction of the FPCB and forms a second inclined angle from the one surface of the support member.

An electronic device according to an embodiment of the disclosure may include a housing including a first surface, a second surface provided parallel to the first surface, and a side surface surrounding the space defined between the first surface and the second surface, a printed circuit board including a camera module spaced apart from the side surface, a support member having at least one surface on which the printed circuit board is disposed, a flexible printed circuit board (FPCB) including a flexible area and a rigid area, and an antenna module electrically connected to the printed circuit board by using the FPCB. The support member may include a first inclined area where the antenna module is disposed and forms a first inclined angle from one surface of the support member, the first inclined area being provided between the side surface and the camera module, and an FPCB support area which extends in a longitudinal direction of the FPCB and forms a second inclined angle from the one surface of the support member. The FPCB may include, in at least a portion thereof, a connector for electrical connection with the printed circuit board and the antenna module.

An electronic device including a millimeter wave antenna module arrangement structure according to various embodiments of the disclosure is capable ensuring the improvement of radiation performance of an antenna module and capable of overcoming design constraints by reducing the shift of other components inside the electronic device according to the arrangement of the millimeter wave antenna module.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1:
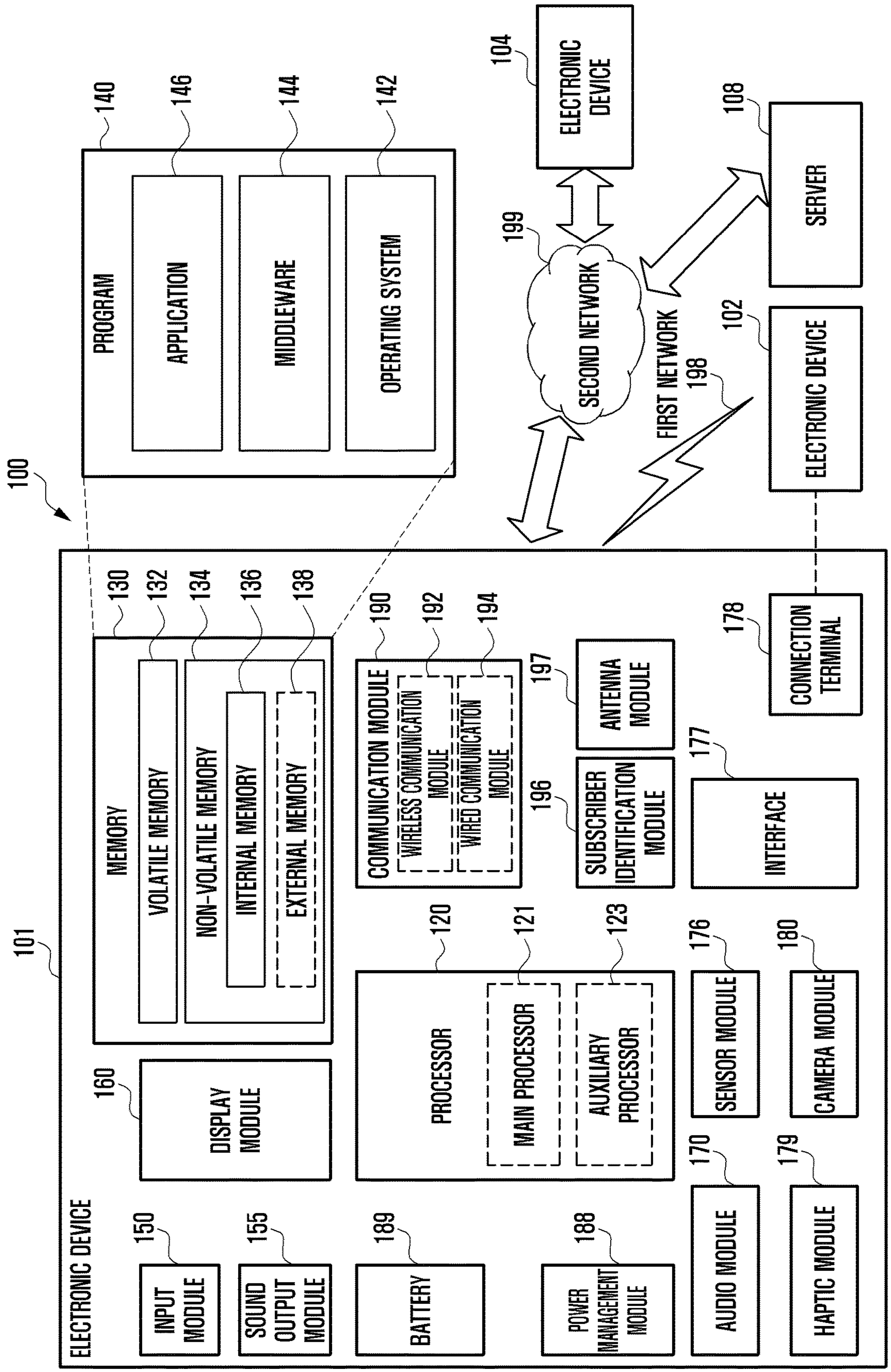
FIG. 1 is a block diagram of an electronic device in a network environment according to various embodiments.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
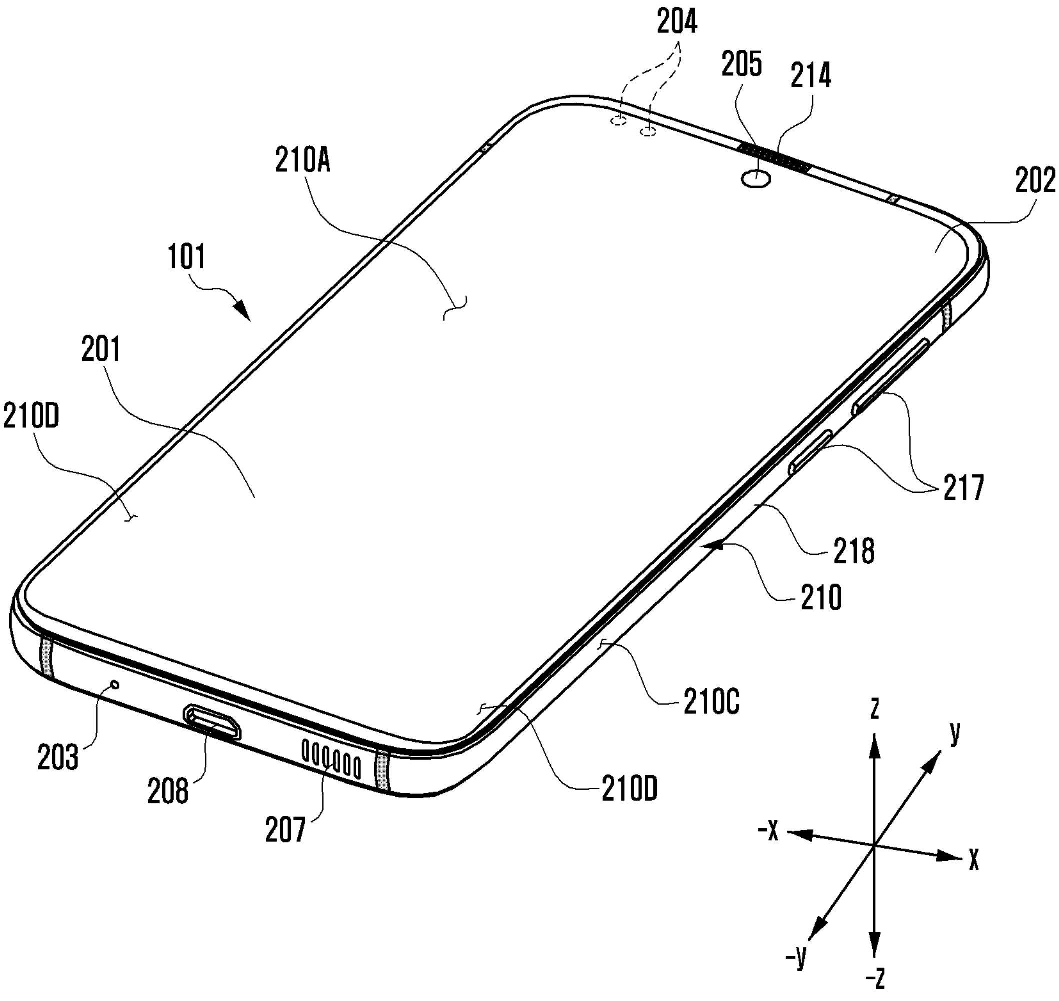
FIG. 2A is a front perspective view of an electronic device according to various embodiments of the disclosure.
Figure 2B:
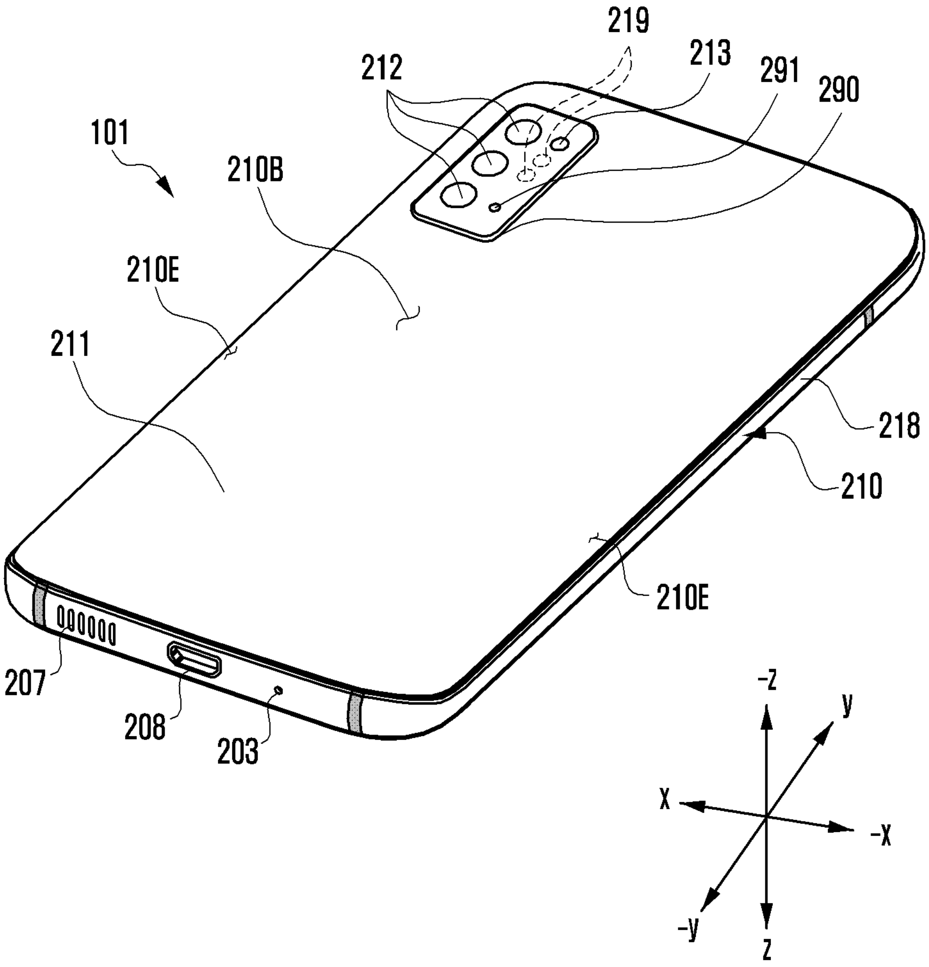
FIG. 2B is a rear perspective view of the electronic device of FIG. 2A according to various embodiments of the disclosure.

FIG. 2A is a perspective view of the front of the electronic device according to various embodiments of the present disclosure. FIG. 2B is a perspective view of the rear of the electronic device of FIG. 2A according to various embodiments of the present disclosure.

The electronic device 101 described below may include at least one of the components of the electronic device 101 previously described in FIG. 1.

Referring to FIGS. 2A and 2B, the electronic device 101 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the electronic device, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

According to various embodiments, the electronic device 101 may include at least one of a display 201, audio modules 203, 207 and 214, sensor modules 204 and 219, camera modules 205, 212 and 213, a key input device 217, an indicator, and connector holes 208 and 209. The electronic device 101 may omit at least one (e.g., the key input device 217 or the indicator) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

The input device 103 may include at least one microphone. In certain embodiments, the input device 203 may include a plurality of microphones disposed to detect the direction of a sound. According to various embodiments, the sound output devices 207 and 214 may include speakers. Speakers may include an external speaker 207 and a call receiver 214. In certain embodiments, the input device 203, the sound output devices 207 and 214, and the connector 208 may be disposed in a space arranged in the housing 210 of the electronic device 101, and may be exposed to the external environment through at least one hole formed in the housing 210. In certain embodiments, the sound output devices 207 and 214 may include a speaker (e.g., piezo speaker) that operates without using a hole formed in the housing 210.

The sensor modules 204 and 219 may generate electrical signals or data corresponding to an internal operating state of the electronic device 101 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 101 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device 205 disposed on the first surface 210A of the electronic device 101, and a second camera device 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the electronic device 101.

The key input device 217 may be disposed on the lateral surface 210C of the housing 210. The electronic device 101 may not include some or all of the key input device 217 described above, and the key input device 217 which is not included may be implemented in another form such as a soft key on the display 201. According to various embodiments, the key input device 217 may be implemented using a pressure sensor included in the display 201.

The indicator may be disposed on the first surface 210A of the housing 210. For example, the indicator may provide status information of the electronic device 101 in an optical form. The indicator may provide a light source associated with the operation of the camera module 205. The indicator may include, for example, a light emitting diode (LED), an IR LED, or a xenon lamp.

The connector holes 208 may include a first connector hole 208 adapted for a connector (e.g., a USB connector) for transmitting and receiving power and/or data to and from an external electronic device, and/or a second connector hole adapted for a connector (e.g., an earphone jack) for transmitting and receiving an audio signal to and from an external electronic device.

Some camera modules 205 of camera modules 205 and 212, some sensor modules 204 of sensor modules 204 and 219, or an indicator may be arranged to be exposed through a display 201. For example, the camera module 205, the sensor module 204, or the indicator may be arranged in the internal space of an electronic device 101 so as to be brought into contact with an external environment through an opening of the display 201, which is perforated up to a front plate 202. According to various embodiments, an area corresponding to some camera module 205 of the display 201 is a part of an area in which content is displayed, and may be formed as a transmission area having designated transmittance. For example, the transmission area may be formed to have transmittance having a range of about 5% to about 20%. The transmission area may include an area overlapped with a valid area (e.g., a field of view (FOV)) of the camera module 205 through which light imaged by an image sensor and for generating an image passes. For example, a transmission area of the display 201 may include an area in which the density of pixels and/or a wiring density are lower than that of surroundings. The camera module 205 may include, for example, under display camera (UDC). In another embodiment, some sensor modules 204 may be arranged to perform their functions without being visually exposed through the front plate 202 in the internal space of the electronic device. For example, in this case, an area of the display 201 facing the sensor module may not require a perforated opening.

According to various embodiments, the electronic device 101 may have a bar-type appearance or a plate-type appearance, but the disclosure is not limited thereto. For example, the illustrated electronic device 101 may be a part of a foldable electronic device, a slidable electronic device, a stretchable electronic device, and/or a rollable electronic device. A "foldable electronic device", a "slidable electronic device", a "stretchable electronic device", and/or a "rollable electronic device" may mean an electronic device in which a display (e.g., the display 330 in FIG. 3) may be bent and deformed so that at least a portion thereof is folded, or wound or rolled, or an area of a display is at least partially expanded and/or is accommodated inside a housing (e.g., the housing 210 in FIG. 2A and FIG. 2B). A foldable electronic device, a slidable electronic device, a stretchable electronic device, and/or a rollable electronic device may be configured such that a display is unfolded or a larger area of a display is exposed to the outside so as to expand and use a screen display area thereof, according to user needs.

Figure 3:
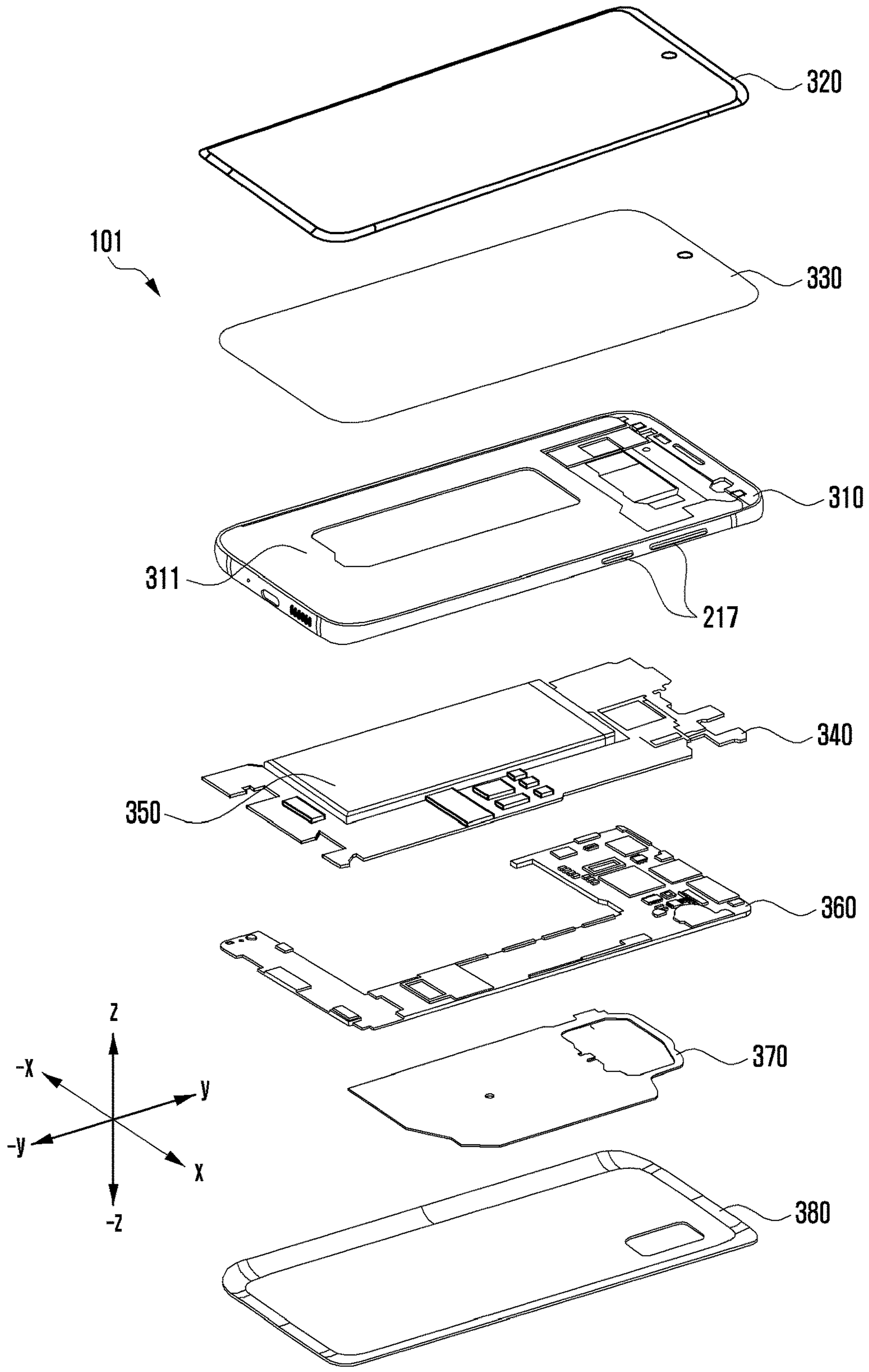
FIG. 3 is an exploded perspective view of the electronic device of FIG. 2A according to various embodiments of the disclosure.

FIG. 3 is an exploded perspective view of the electronic device 101 in FIG. 2A according to various embodiments of the disclosure.

An electronic device 101 in FIG. 3 may be at least partially similar to the electronic device 101 in FIG. 2A and FIG. 2B, or may include another embodiment of the electronic device.

Referring to FIG. 3, the electronic device 101 (e.g., the electronic device 101 in FIG. 2A or FIG. 2B) may include a lateral member 310 (e.g., a lateral bezel structure), a first support member 311 (e.g., a bracket or a support structure), a front plate 320 (e.g., a front cover), a display 330 (e.g., the display 201 in FIG. 2A), a substrate 340 (e.g., a printed circuit board (PCB), a flexible PCB (FPCB), or a rigid-flexible PCB (RFPCB)), a battery 350, a second support member 360 (e.g., a rear case), an antenna 370, and a rear plate 380 (e.g., a rear cover). In some embodiments, at least one (e.g., the first support member 311 or the second support member 360) of the elements may be omitted from the electronic device 101, or other elements may be additionally included therein. At least one of elements of the electronic device 101 may be the same as or similar to at least one of elements of the electronic device 101 in FIG. 2A or FIG. 2B, and overlapping descriptions thereof will be omitted hereinafter.

The first support member 311 may be disposed inside the electronic device 101, and may be connected to the lateral member 310 or integrally formed with the lateral member 310. For example, the first support member 311 may be formed of a metal material and/or a non-metal (e.g., polymer) material. The first support member 311 may have one surface to which the display 330 is coupled, and the other surface to which the substrate 340 is coupled. A processor, a memory, and/or an interface may be mounted to the substrate 340. For example, the processor may include one or more of a central processing device, an application processor, a graphic processing device, an image signal processor, a sensor hub processor, and a communication processor.

For example, the memory may include a volatile memory or a non-volatile memory.

For example, the interface may include a high definition multimedia interface (HDMI), a universal serial bus (USB) interface, an SD card interface, and/or an audio interface. For example, the interface may electrically or physically connect the electronic device 101 to an external electronic device, and may include a USB connector, an SD card/MMC connector, or an audio connector.

The battery 350 may be a device for supplying power to at least one element of the electronic device 101, and for example, may include a non-rechargeable primary cell, a rechargeable secondary cell, or a fuel cell. For example, at least a part of the battery 350 may be disposed on substantially the same plane as the substrate 340. The battery 350 may be integrally disposed inside the electronic device 101. As another embodiment, the battery 350 may also be disposed detachably from the electronic device 101.

The antenna 370 may be disposed between the rear plate 380 and the battery 350. For example, the antenna 370 may also include a near field communication (NFC) antenna, a wireless charging antenna, and/or a magnetic secure transmission (MST) antenna. For example, the antenna 370 may be configured to perform a short-range communication with an external device, or may wirelessly transmit/receive a power required for charging. In another embodiment, an antenna structure may be formed by a part of the lateral bezel structure 310 and/or the first support member 311, or a combination thereof.

In describing the electronic device 101 according to various embodiments of the disclosure, the first direction may refer to the negative x-axis direction, and the second direction may refer to the positive x-axis direction. The third direction may refer to the negative y-axis direction, and the fourth direction may refer to the positive y-axis direction. The first direction (the −x-axis direction) and the second direction (the −y-axis direction) intersect each other and may be orthogonal to each other. The second direction (the x-axis direction) and the fourth direction (the y-axis direction) intersect each other and may be orthogonal to each other.

Figure 4:
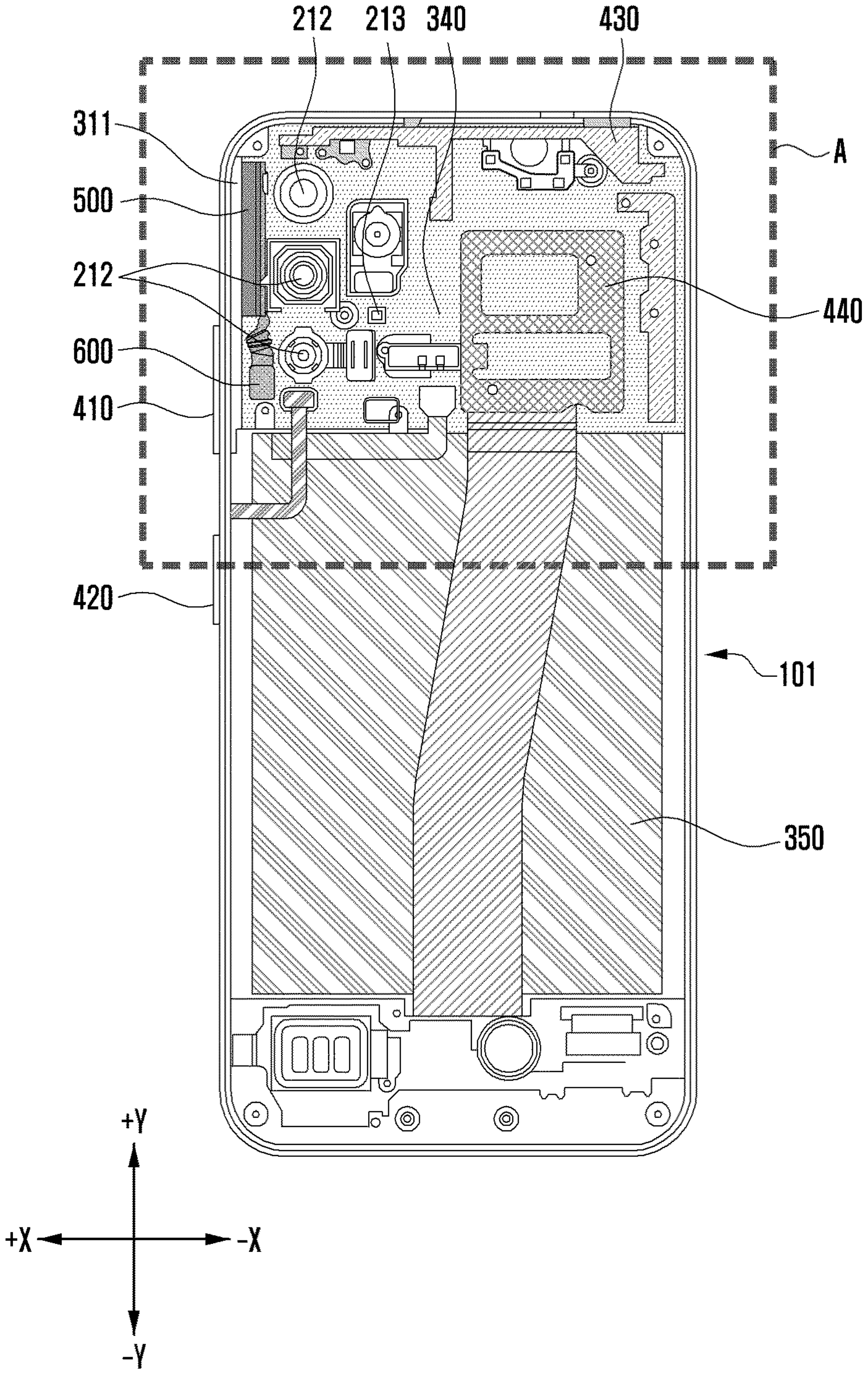
FIG. 4 is a plan view illustrating an internal configuration of an electronic device according to various embodiments of the disclosure.

FIG. 4 is a plan view illustrating an internal configuration of an electronic device 101 according to various embodiments of the disclosure.

Figure 5:
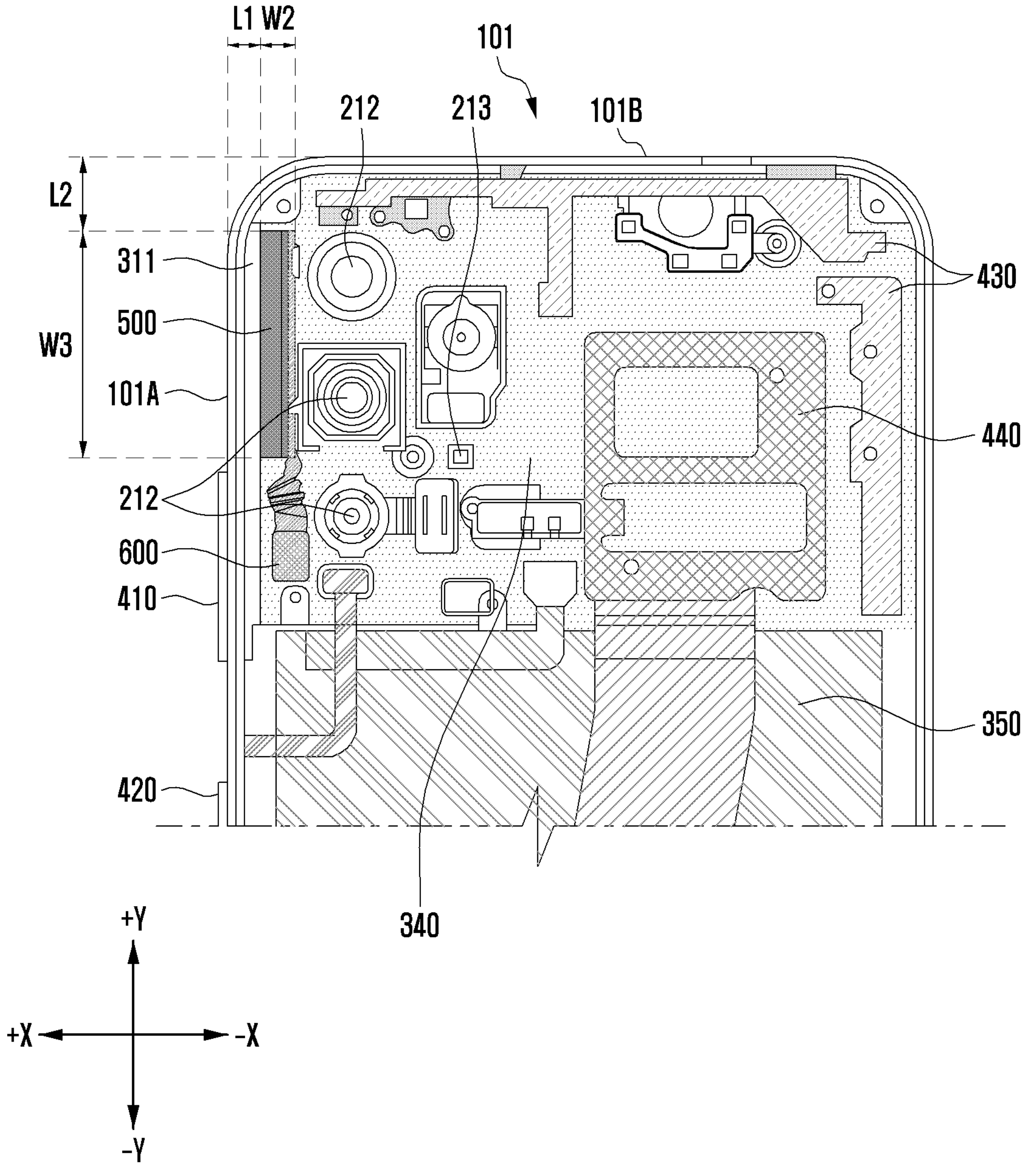
FIG. 5 is an enlarged plan view illustrating the area included in the box line in FIG. 4.

FIG. 5 is an enlarged plan view illustrating the area included in the box line A in FIG. 4.

Referring to FIGS. 4 and 5, the electronic device 101 may include a support member 311 (the first support member in FIG. 3), a printed circuit board 340 (the substrate 340 in FIG. 3), a camera module 212 (the second camera module in FIG. 3), a flash 213, a battery 350, side surface volume key 410 as a volume control key, a side surface fingerprint key 420, a flexible printed circuit (FPC) antenna 430, a short-range wireless communication module 440 (e.g., a near field communication (NFC) module), an antenna module 500 (e.g., the antenna module 197 in FIG. 1), and/or a flexible printed circuit board (FPCB) 600. The support member 311 may provide an inner housing of the electronic device 101. The support member 311 may have a plate portion which is generally flat, and a sidewall portion (e.g., the lateral member 310) which extends from the plate (or flat) portion and defines a sidewall portion or an inner side surface of the inner housing (e.g., the support member 311 having the lateral member 310). The inner side surface faces the inner area of the housing at which various components are disposed (e.g., the printed circuit board 340, the camera module 212, the FPC antenna 430, etc.

In various embodiments, on one surface of the printed circuit board 340, a camera module 212, a flash 213, an FPC antenna 430, and a short-range wireless communication module 440 (e.g., an NFC module) may be mounted.

The camera module 212 may capture a still image and a video image, to provide various functions (e.g., image capturing, video capturing, etc.) to the electronic device 101 as a functional component thereof.

The flash 213 may temporarily emit strong light to enable the camera modules 205 and 212 to capture a still image and a video image even in a dark place. The flash 213 may include, for example, a light-emitting diode or a xenon lamp.

The battery 350 is a device configured to supply power (e.g., electrical power) to at least one component of the electronic device 101, and may include, for example, a non-rechargeable primary battery, a rechargeable secondary battery, or a fuel cell. At least a portion of the battery 350 may be disposed on substantially the same plane as, for example, the printed circuit board 340. As being on substantially the same plane, elements may be coplanar with each other.

The side surface volume key 410 may function to adjust the volume of sound generated by the electronic device 101. The side surface fingerprint key 420 may recognize a biometric input such as a user's fingerprint that may be located thereon.

The FPC antenna 430 may be an antenna manufactured (or provided) by engraving an antenna pattern on a flexible printed circuit board (FPCB). The FPC antenna may execute the function of connecting the electronic device 101 to a global positioning system (GPS) and wireless fidelity (WIFI).

The short-range wireless communication module 440 (e.g., an NFC module) is a module that enables short-range wireless communication and may enable two-way communication when two or more terminals or various electronic devices are brought close to each other.

In various embodiments, the antenna module 500 (e.g., the antenna module 197 in FIG. 1) may include a millimeter wave antenna module. Millimeter waves generally refer to waves (e.g., electromagnetic waves) with a frequency in a band of about 30 gigahertz (GHz) to about 300 GHz, and may have a wavelength of about 1 millimeter (mm) to about 10 millimeters (mm). The millimeter waves are capable of focusing and transmitting signals in a specific direction, improving transmission efficiency at a low frequency. However, due to the short wavelength, the millimeter waves may cause more transmission loss compared to low frequency waves. The antenna module 500 may be electrically connected to the printed circuit board 340 via the FPCB 600. In an embodiment, the antenna module 500 may include a signal-radiating element to define a signal-radiating antenna.

The FPCB 600 is disposed between the antenna module 500 and the printed circuit board 340 to electrically connect the antenna module 500 to the printed circuit board 340. The FPCB 600 may include conductive and non-conductive materials. The FPCB 600 may include a flexible material to have flexibility.

With respect to the battery 350, the antenna module 500, the FPCB 600, the camera module 212, the flash 213, the FPC antenna 430, and/or the short-range wireless communication module 440 (e.g., an NFC module) may be located in the fourth direction (the y-axis direction).

The antenna module 500 may be located in the second direction (the x-axis direction) with respect to the camera module 212. The flash 213 may be located in the first direction (the −x-axis direction) with respect to the camera module 212.

The camera module 212 may be located in the second direction (the x-axis direction) with respect to the flash 213. The short-range wireless communication module 440 (e.g., an NFC module) may be located in the first direction (the −x-axis direction) with respect to the flash 213.

The FPC antenna 430 may be located in the first direction (the −x-axis direction) and the fourth direction (the y-axis direction) with the respect to the short-range wireless communication module 440 (e.g., an NFC module).

The FPCB 600 may be located in the third direction (the −y-axis direction) with respect to the antenna module 500.

Referring to FIG. 5, a first side surface 101A among side surfaces of the electronic device 101 is a surface extended parallel to the y-axis direction of the electronic device 101 and may be oriented in the positive x-axis direction along an x-y plane. The second side surface 101B among the side surfaces of the electronic device 101 is a surface extended parallel to the x-axis direction of the electronic device 101 and may be oriented in the positive y-axis direction. The first side surface 101A and the second side surface 101B may meet at a corner of the electronic device 101, to form a rounded corner, a rectilinear corner, etc. A thickness of the electronic device 101 and various components or layers thereof may extend along the z-axis direction (e.g., a thickness direction).

In various embodiments, the electronic device 101 may include a housing 210 (see FIG. 2A) that includes a first surface (or front surface) 210A (see FIG. 2A), a second surface (or rear surface) 210B (see FIG. 2B) parallel to the first surface 210A (see FIG. 2A), and a side surface 210C (see FIG. 2A) surrounding the space defined between the first surface 210A (see FIG. 2A) and the second surface 210B (see FIG. 2B). The side surface 210C may include side surfaces respectively extending along the x-axis and the y-axis directions.

The first side surface 101A of the electronic device 101 may refer to the surface oriented in the positive x-axis direction within the side surface 210C (see FIG. 2A) of the housing 210 (see FIG. 2A), and the second side surface 101B may refer to the surface oriented in the positive y-axis within the side surface 210C (see FIG. 2A) of the housing 210 (see FIG. 2A).

In various embodiments, on the x-y plane, the antenna module 500 may have a second width W2 in (or along) the x-axis direction and a third width W3 in the y-axis direction. The third width W3 may be longer or greater than the second width W2.

In various embodiments, the antenna module 500 may be spaced apart from the first side surface 101A of the electronic device 101 by a first length L1 in the first direction (the −x-axis direction). The antenna module 500 may be spaced apart from the second side surface 101B of the electronic device 101 by a second length L2 in the third direction (the −y-axis direction).

In various embodiments, the first length L1 may be smaller than the distance (or dimension) of the camera module 212 in the first direction (the −x-axis direction) from the first side surface 101A of the electronic device 101. The second length L2 may be smaller than the distance of the battery 350 from the second side surface 101B of the electronic device 101 in the third direction (the −y-axis direction). That is, the antenna module 500 may be closer to an outer edge of the electronic device 101 than either of the camera module 212 and the battery 350.

Figure 6A:
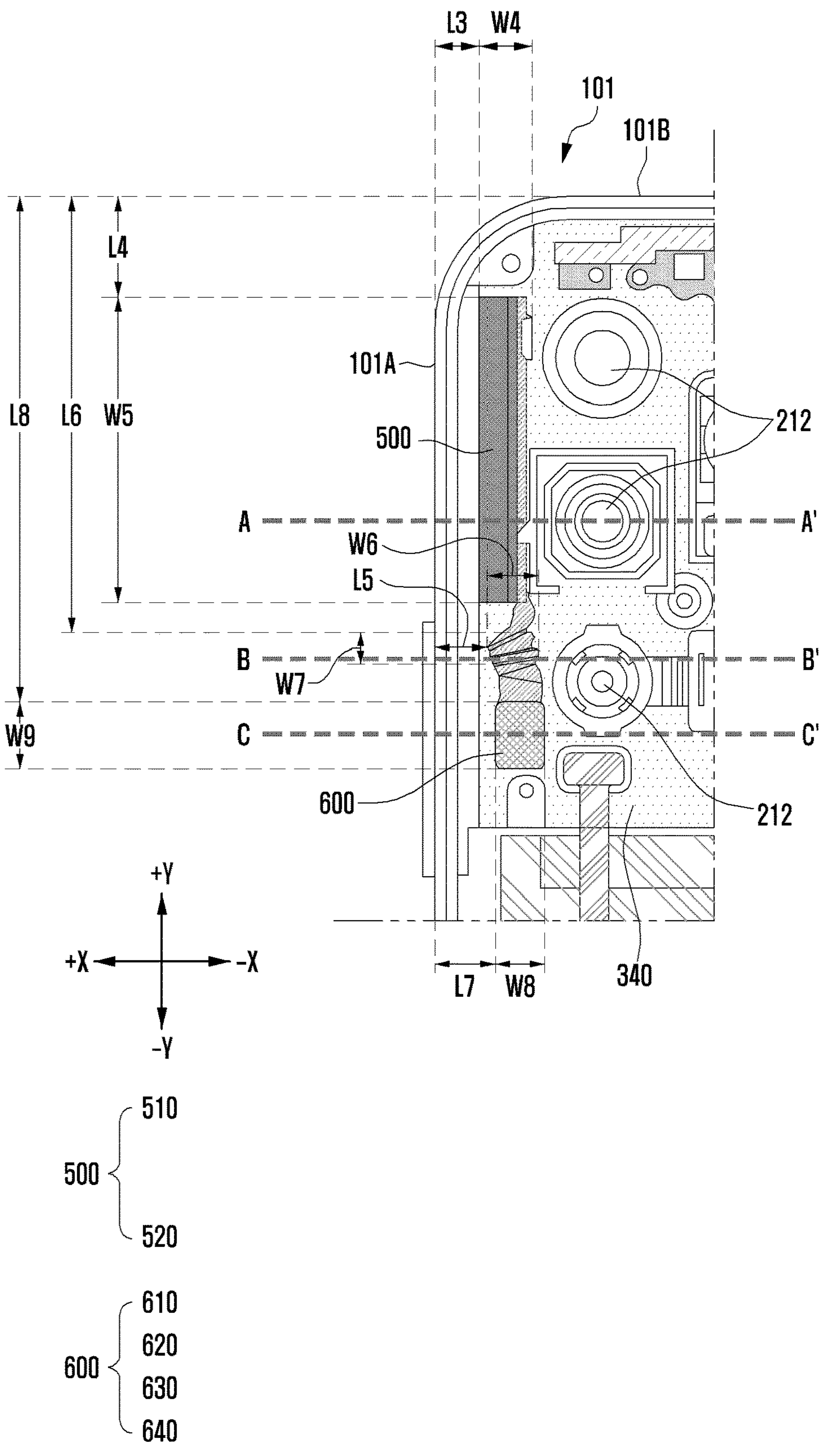
FIGS. 6A, 6B, 6C, and 6D are views illustrating a first inclined area, a second inclined area, and a flexible printed circuit board (FPCB) support area according to various embodiments of the disclosure.

FIG. 6A is a view illustrating the positions of a first inclined area 450, a second inclined area 460, and an FPCB support area 470 as a flexible circuit board support surface provided on the support member 311.

Figure 6B:
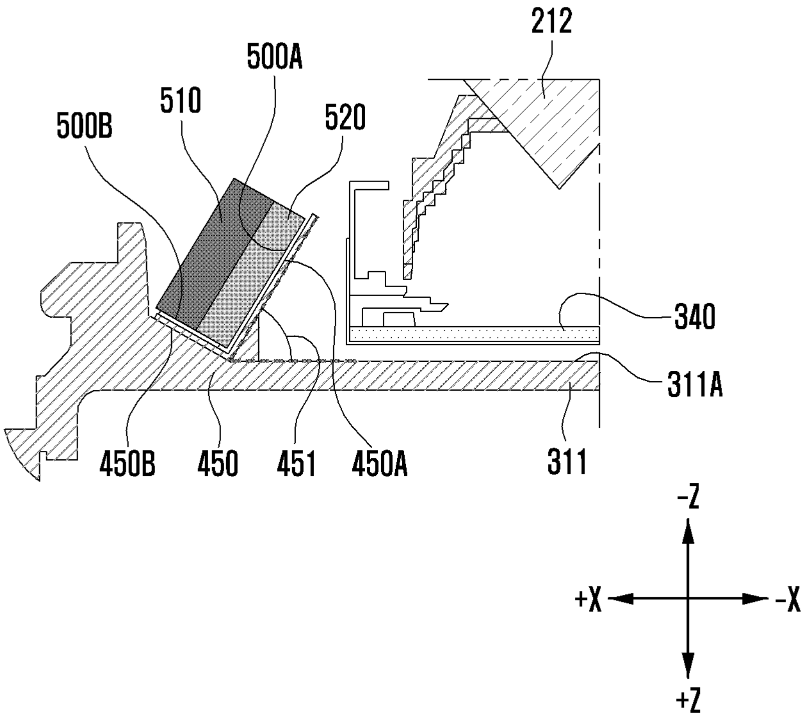

FIG. 6B is a cross-sectional view of the electronic device 101 taken along line A-A' of FIG. 6A in which the first inclined area 450 is illustrated.

Figure 6C:
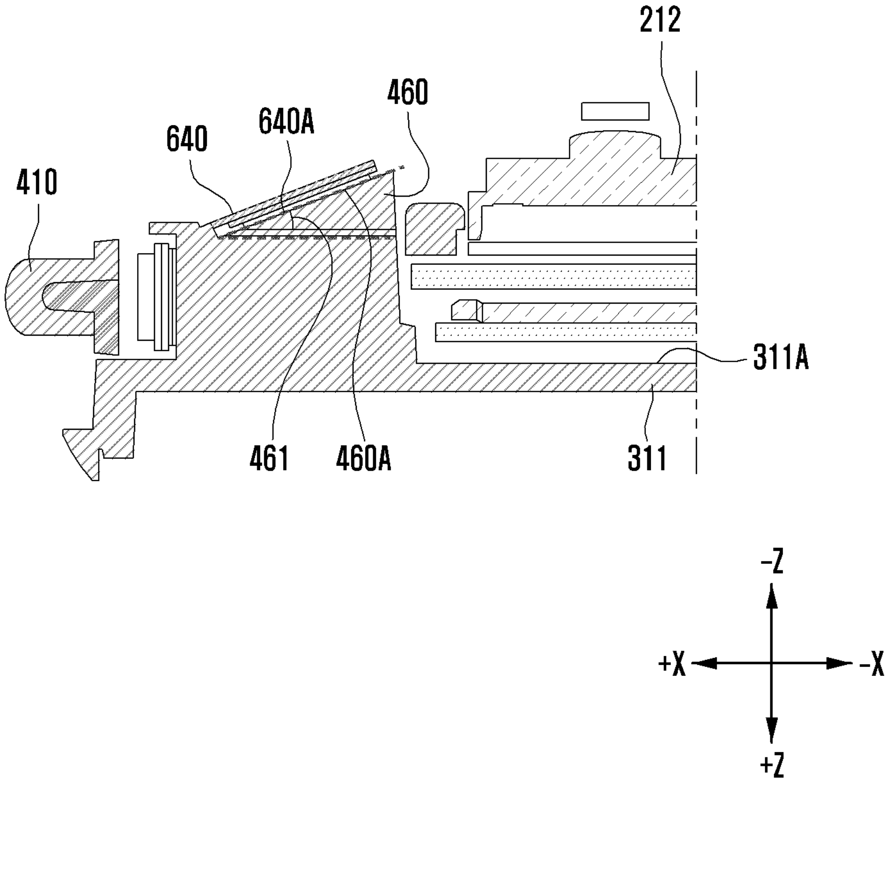

FIG. 6C is a cross-sectional view of the electronic device 101 taken along line B-B' of FIG. 6A in which the second inclined area 460 is illustrated.

Figure 6D:
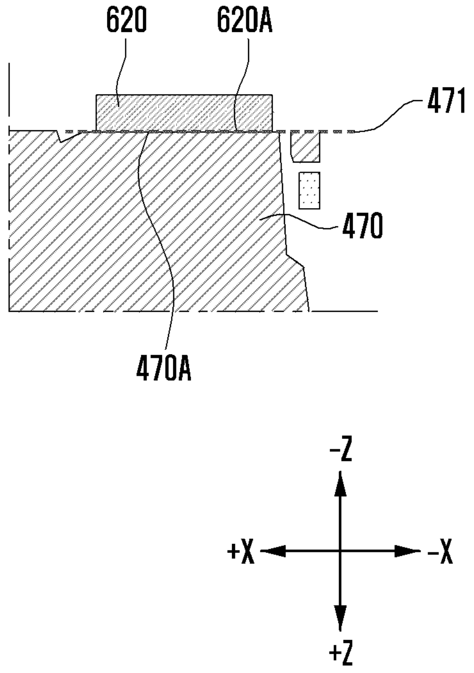

FIG. 6D is a cross-sectional view of the electronic device 101 taken along line C-C' in FIG. 6A in which the FPCB support area 470 is illustrated.

Referring to FIGS. 6A, 6B, 6C, and 6D, in various embodiments, the printed circuit board 340 may be coupled to at least a portion of the support member 311. The printed circuit board 340 may be disposed on at least one surface 311A of the support member 311. The support member 311 may be made of, for example, a metal material and/or a non-metal (e.g., polymer) material.

Referring to FIGS. 6A, 6B, 6C, and 6D, in various embodiments, the support member 311 may include the first inclined area 450, the second inclined area 460, and/or the FPCB support area 470. In an embodiment, the sidewall portion or side surface of the inner housing (e.g., the support member 311 having the lateral member 310) may include or define the first inclined area 450, the second inclined area 460, and/or the FPCB support area 470. The support member 311 may provide the first inclined area 450, the second inclined area 460, and the FPCB support area 470 on the one surface 311A. The surface 311A may define an inner surface of the support member 311. The inner surface may be defined at each of the flat portion and the sidewall portion. In some embodiments, the support member 311 may not include the second inclined area 460.

The FPCB 600 may include a module connection area 610 (see FIG. 9), a board connection area 620 (see FIG. 9), a flexible area 630 (see FIG. 9), and/or a rigid area 640 (see FIG. 9). The FPCB 600 may include at least one rigid area 640 (see FIG. 9).

Referring to FIG. 6A, in various embodiments, the x-axis position of the camera module 212 may be located at a position shifted from the x-axis positions of the antenna module 500 and the FPCB 600 in the first direction (the −x-axis direction). When the FPCB 600 is shifted in the first direction (the −x-axis direction), the camera module 212 may be shifted in the first direction (the −x-axis direction).

In various embodiments, the camera module 212 may be spaced apart from the side surface 210C (see FIG. 2A) of the housing 210 (see FIG. 2A) and placed on the printed circuit board 340 to overlap the circuit board 340. For example, the camera module 212 may be spaced apart from the first side surface 101A of the electronic device 101.

Referring to FIG. 6A, in various embodiments, on the x-y plane, the first inclined surface area 450 may have a fourth width W4 in the x-axis direction and a fifth width W5 in the y-axis direction. The first inclined area 450 may be provided in at least a portion of the length of the fifth width W5 in the y-axis direction, or may be provided over the entire length of the fifth width W5.

Referring to FIG. 6A, in various embodiments, on the x-y plane, the second inclined surface area 460 may have a sixth width W6 in the x-axis direction and a seventh width W7 in the y-axis direction.

Referring to FIG. 6A, on the x-y plane, the FPCB support area 470 may have an eighth width W8 in the x-axis direction and a ninth width W9 in the y-axis direction. For example, the FPCB support area 470 may extend in the longitudinal direction of the FPCB 600.

In various embodiments, the first inclined area 450 may be spaced apart from the first side surface 101A of the electronic device 101 by a third length L3 in the first direction (the −x-axis direction). The first inclined area 450 may be spaced apart from the second side surface 101B of the electronic device 101 by a fourth length LA in the third direction (the −y-axis direction).

In various embodiments, the third length L3 may be smaller than the distance of the camera module 212 in the first direction (the −x-axis direction) from the first side surface 101A of the electronic device 101. The first inclined area 450 may be disposed between the side surface 210C of the housing 210 (e.g., the first side surface 101A of the electronic device 101) and the camera module 212.

In various embodiments, the second inclined area 460 may be spaced apart from the first side surface 101A of the electronic device 101 by a fifth length L5 in the first direction (the −x-axis direction). The second inclined area 460 may be spaced apart from the second side surface 101B (see FIG. 7B) of the electronic device 101 by a sixth length L6 in the third direction (the −y-axis direction).

In various embodiments, the FPCB support area 470 may be spaced apart from the first side surface 101A of the electronic device 101 by a seventh length L7 in the first direction (the −x-axis direction). The FPCB support area 470 may be spaced apart from the second side surface 101B of the electronic device 101 by an eighth length L8 in the third direction (the −y-axis direction).

In various embodiments, the fourth length L4 may be shorter than the sixth length L6. The sixth length L6 may be shorter than the eighth length L8.

In various embodiments, the third length L3 may be shorter than the fifth length L5 and the seventh length L7.

Referring to FIG. 5, for example, along the support member, in a direction perpendicular to the length of the side surface (e.g., along an x-axis direction), each of the signal-radiating antenna (e.g., the antenna module 500) and the flexible circuit board (e.g., the FPCB 600) are between the side surface of the housing and the camera. The housing may be considered as further including a side surface portion 101B extended from the side surface 101A in a direction (e.g., along the x-axis) crossing the length of the side surface, and each of the camera of the circuit board, the signal-radiating antenna and the flexible circuit board are spaced apart from both the side surface and the side surface portion of the housing.

Referring to FIG. 6B, in various embodiments, the antenna module 500 may be disposed in at least a portion of the first inclined area 450. The first inclined area 450 may have a first surface 450A (e.g., a first inclined surface of the support member 311) and a second surface 450B (e.g., a second inclined surface of the support member 311) provided on at least partial areas thereof. The first surface 450A of the first inclined area 450 and the second surface 450B of the first inclined area 450 may virtually intersect each other such as to be orthogonal to each other. The antenna module 500 may have a first surface 500A (e.g., a first antenna surface) and a second surface 500B (e.g., a second antenna surface) provided on at least partial areas thereof, among outer surfaces thereof. The first surface 500A of the antenna module 500 and the second surface 500B of the antenna module 500 may intersect each other such as to be orthogonal to each other.

In various embodiments, the antenna module 500 may be arranged such that the first surface 500A thereof corresponds to the first surface 450A of the first inclined area 450. The antenna module 500 may be arranged such that the second surface 500B thereof corresponds to the second surface 450A of the first inclined area 450. Respective antenna surfaces and inclined surfaces of the support member 311 may face each other and may be parallel to each other.

In various embodiments, the first surface 450A of the first inclined area 450 may form a first inclined angle 451 (e.g., a first angle) with the one surface 311A of the support member 311. The first inclined angle 451 may be greater than 0 degrees and less than about 90 degrees. For example, the first inclined angle 451 may be about 60 degrees.

In various embodiments, the antenna module 500 may include an antenna PCB area 510 and an antenna component area 520. The antenna PCB area 510 may be a printed circuit board (PCB) containing an antenna. The antenna component area 520 may include components necessary for the antenna module 500 to perform its function.

Referring to FIG. 6B, in various embodiments, the antenna module 500 may be located in the second direction (the x-axis direction) with respect to the printed circuit board 340.

Referring to FIG. 6C, in various embodiments, the rigid area 640 of the FPCB 600 may be located in at least a portion of the second inclined area 460. The second inclined area 460 may have one surface 460A (e.g., a third inclined surface of the support member 311) in at least a portion thereof. The rigid area 640 may have one surface 640A in at least a portion thereof.

In various embodiments, the rigid area 640 may be arranged such that the one surface 640A thereof corresponds to (or faces) the one surface 460A of the second inclined area 460. The FPCB 600 may be bonded to the first surface 460A of the second inclined area 460, at the one surface 640A of the rigid area 640, by using an adhesive member (not illustrated). For example, the adhesive member (not illustrated) may include a tape (not illustrated). The rigid area 640 of the FPCB 600 may be provided in a type in which one surface 640A thereof is simply supported on the one surface 460A of the second inclined area 460 rather than being bonded to the one surface 460A of the second inclined area 460. That is, the rigid area 640 of the FPCB 600 may be coupled to the second inclined area 460 solely by support of one surface 460A.

In various embodiments, the one surface 460A of the second inclined area 460 may form a third inclined angle 461 (e.g., a third angle) with the one surface 311A of the support member 311. The third inclined angle 461 may be smaller than the first inclined angle 451.

In various embodiments, the side surface volume key 410 may be located in the second direction (the x-axis direction) with respect to the support member 311. The side surface volume key 410 may include a metal component. When the side surface volume key 410 includes a metal component and the y-axis direction position thereof at least partially overlaps the y-axis direction position of the antenna module 500, the side surface volume key 410 may affect the signals (e.g., electrical signals) radiated from the antenna module 500.

In various embodiments, the side surface volume key 410 may be located at a position spaced apart from the antenna module 500 in the third direction (the −y-axis direction). For example, the side surface volume key 410 may be provided such that the y-axis position thereof does not overlap the y-axis position of the antenna module 500. For example, the side surface volume key 410 may be provided not to overlap the position of the antenna module 500 in the longitudinal direction thereof. The side surface volume key 410 may be provided such that the y-axis position thereof is different from the y-axis position of the antenna module 500, so that the signals radiated from the antenna module 500 are not affected by the side surface volume key 410.

Referring to FIG. 6D, in various embodiments, the FPCB support area 470 may support the FPCB 600. For example, the FPCB support area 470 may have the board connection area 620 of the FPCB 600 located in at least a portion thereof, and may support the board connection area 620.

In various embodiments, the FPCB support area 470 may provide one surface 470A in at least a portion thereof. The board connection area 620 may provide one surface 620A in at least a portion thereof. The board connection area 620 may be arranged so that the one surface 620A thereof corresponds to the one surface 470A of the FPCB support area 470. In an embodiment, the lateral member may define the first inclined surface 450A, the second inclined surface 460A and the flexible circuit board support surface 470A in order along the length of the side surface (e.g., along the y-axis direction).

In various embodiments, the one surface 470A of the FPCB support area 470 may form a second inclined angle 471 (e.g., a second angle) with the one surface 311A of the support member 311. The second inclined angle 471 may be smaller than the first inclined angle 451 and may be 0 degrees (for example, the state in which the one surface 470A is parallel to the one surface 311A of the support member 311).

Figure 7A:
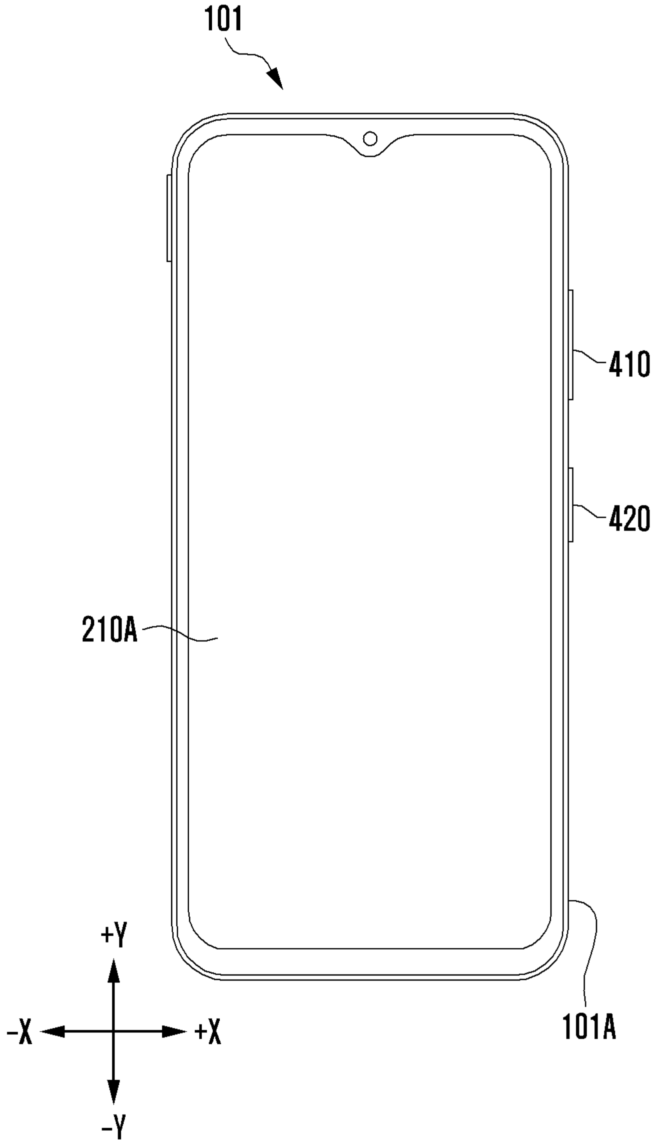
FIGS. 7A, 7B, and 7C are a front view, a rear view, and a side view of an electronic device according to various embodiments of the disclosure.

FIG. 7A is a view illustrating the external appearance of the electronic device 101 when the electronic device 101 is viewed from the front surface (e.g., the first surface 210A) (see FIG. 2A) of the housing 210 (see FIG. 2A)).

Figure 7B:
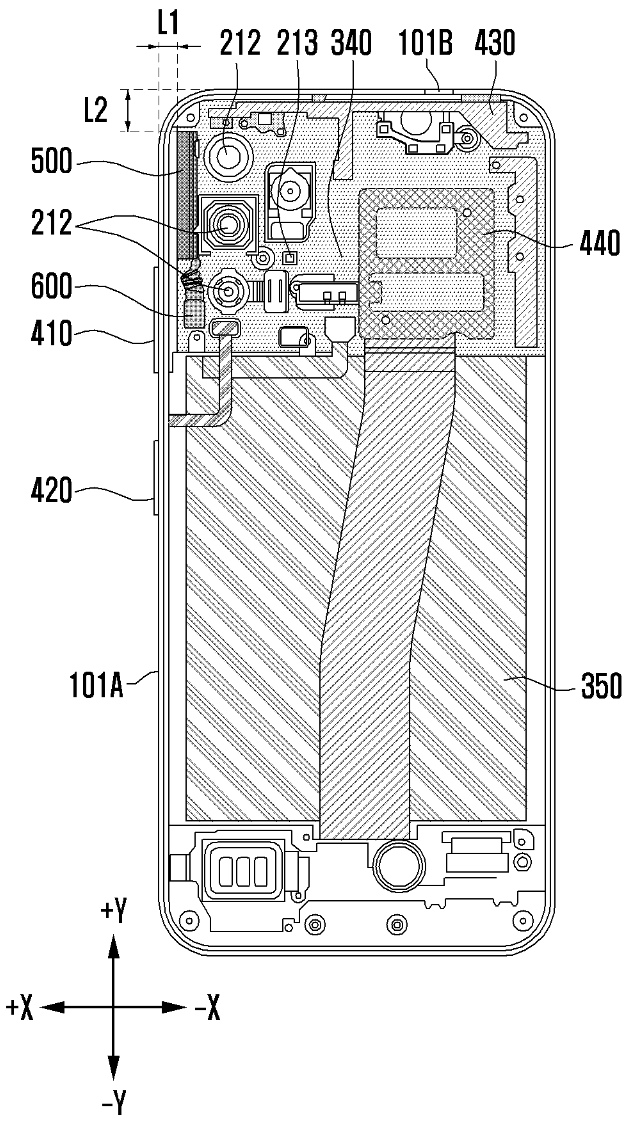

FIG. 7B is a cross-sectional view illustrating the internal appearance of the electronic device 101 when the electronic device 101 is viewed from the rear surface (e.g., the second surface 210B (e.g., see FIG. 2B) of the housing 210 (see FIG. 2A)).

Figure 7C:
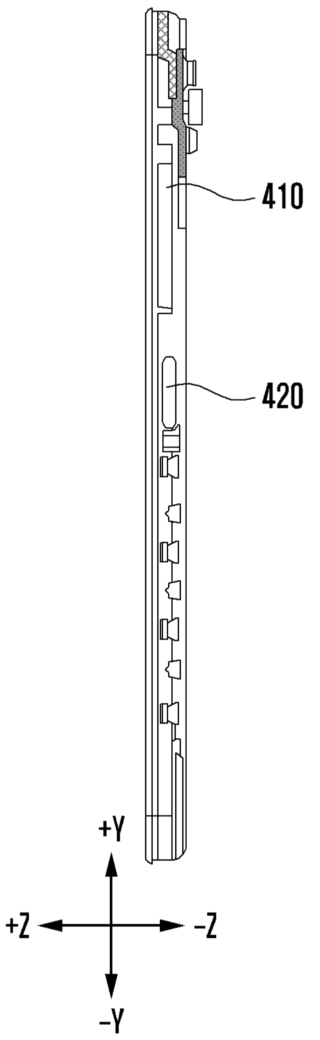

FIG. 7C is a view illustrating the electronic device 101 when the side surface (e.g., the first side surface 101A of the electronic device 101) is viewed in the first direction (the −x-axis direction).

Referring to FIG. 7A, in various embodiments, the side surface volume key 410 and the side surface fingerprint key 420 may be located on the first side surface 101A of the electronic device 101.

Referring to FIG. 7B, the antenna module 500 may be spaced apart from the first side surface 101A of the electronic device 101 by a first length L1 in the first direction (the −x-axis direction). The antenna module 500 may be spaced apart from the second side surface 101B of the electronic device 101 by a second length L2 in the third direction (the −y-axis direction).

The camera module 212 may be located in the first direction (the −x-axis direction) with respect to the antenna module 500, and the battery 350 may be located in the third direction (the −y-axis direction) with respect to the antenna module 500.

Referring to FIG. 7C, in various embodiments, the side surface fingerprint key 420 may be located in the third direction (the −y-axis direction) with respect to the side surface volume key 410.

Figure 8A:
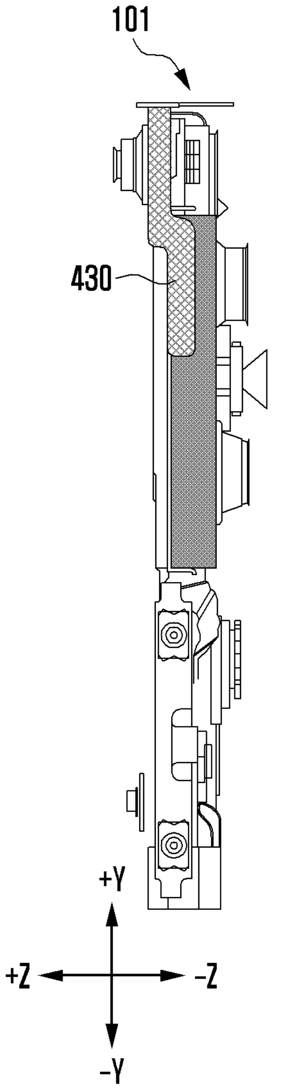
FIGS. 8A, 8B, and 8C are views illustrating an arrangement of a flexible printed circuit (FPC) antenna in an electronic device according to various embodiments of the disclosure in a state in which a housing is removed.

FIG. 8A is a view illustrating a y-z cross section inside the electronic device 101 in the state in which the housing 210 (see FIG. 2A) is removed.

Figure 8B:
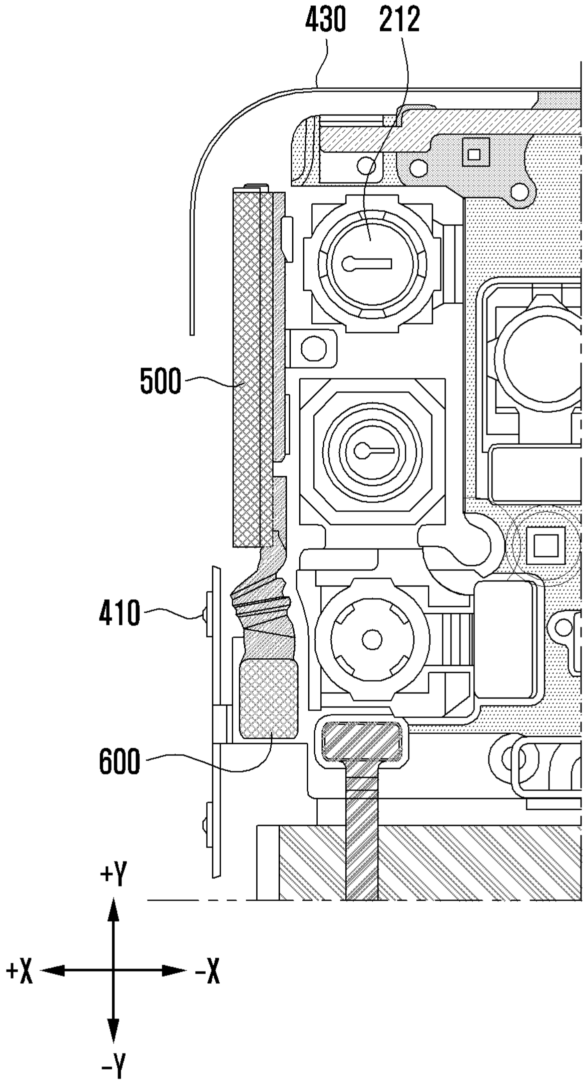

FIG. 8B is a view illustrating an x-y cross section inside the electronic device 101 in the state in which the housing 210 (see FIG. 2A) is removed.

Figure 8C:
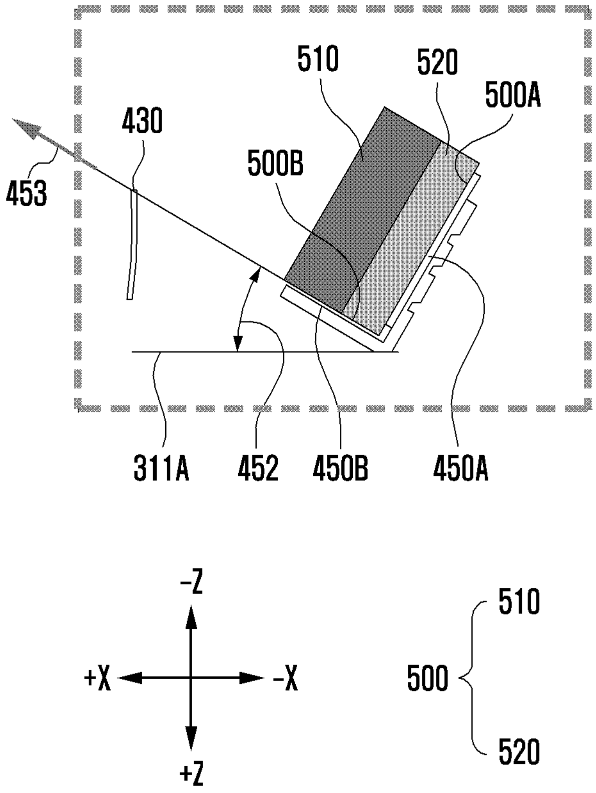

FIG. 8C is a cross-sectional view illustrating the relative arrangement relationship between the FPC antenna 430 and the antenna module 500.

Referring to FIGS. 8A and 8B, the antenna module 500 may have an FPC antenna 430 located in at least a portion thereof in the second direction (the x-axis direction) with respect to the center thereof. Referring to FIG. 8A, the y-axis coordinate of the antenna module 500 may overlap at least a portion of the y-axis coordinate of the FPC antenna 430.

When the FPC antenna 430 is located on the path of signals radiated from the antenna module 500 (e.g., a signal path), the performance of the antenna module 500 may be degraded. In various embodiments, in order to prevent performance degradation of the antenna module 500, the antenna module 500 may radiate signals in a direction to avoid interference with the FPC antenna 430. For example, the second surface 450B of the first inclined area 450 (see FIG. 6B) may form a fourth inclined angle 452 (e.g., a fourth angle) with the one surface 311A (see FIG. 6B) of the support member 311 (see FIG. 6B). The fourth inclined angle 452 may be determined such that the FPC antenna 430 is not located on the radiation path of the signals generated from the antenna module 500.

The antenna module 500 may be arranged such that the first surface 500A corresponds to the first surface 450A of the first inclined area 450 (see FIG. 6B), and the second surface 500B corresponds to the second surface 450B of the first inclined area 450 (see FIG. 6B).

In various embodiments, a radial direction 453 may refer to a direction inclined from the positive x-axis direction and toward the negative z-axis (e.g., toward the rear of the electronic device 101) by the fourth inclined angle 452 of the first inclined area 450. When the antenna module 500 is arranged to correspond to each surface 450A or 450B of the first inclined area 450 (see FIG. 6B), the antenna module 500 is capable of radiating signals in the radiation direction 453. The signals radiated in the radiation direction 453 (e.g., the signal direction) are capable of avoiding interference caused by the FPC antenna 430, thereby preventing performance degradation of the antenna module 500. Referring to FIG. 8C, the signal traveling along the signal direction passes over the top edge of the FPC antenna 430 which is furthest along the negative z-axis direction. In an embodiment, a flexible circuit antenna extends between the side surface of the housing and the signal-radiating antenna (e.g., the antenna module 500). The signal-radiating antenna radiates signals in a radiation direction 453 towards the side surface of the housing, and the radiation direction 453 does not intersect the flexible circuit antenna (e.g., the FPC antenna 430 which is extended between the side surface of the housing and the signal-radiating antenna.

Figure 9A:
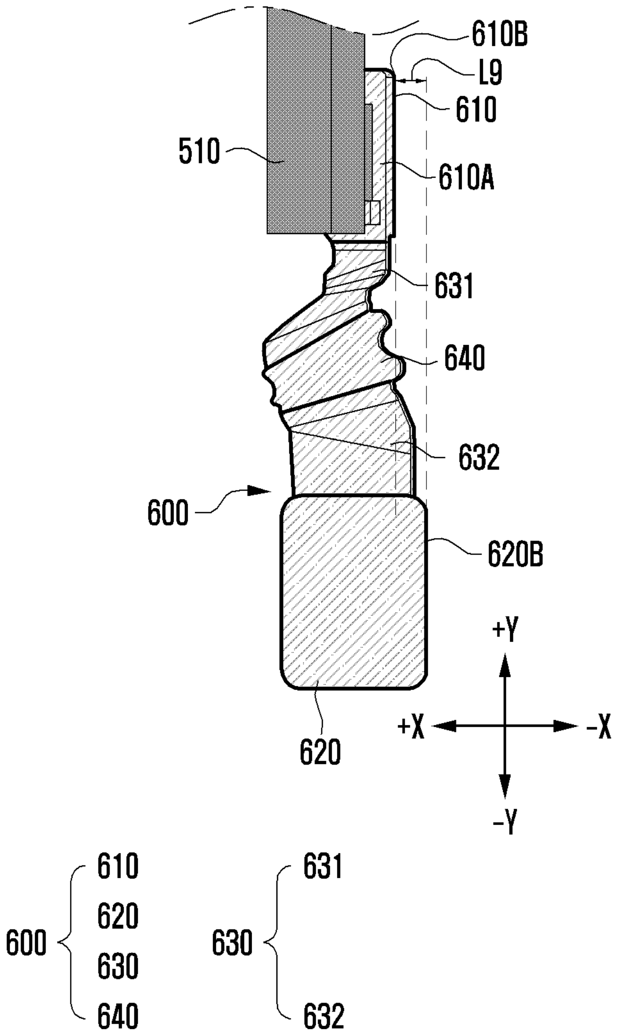
FIGS. 9A, 9B, and 9C are plan views showing an FPCB including one rigid area according to an embodiment of the disclosure.

FIG. 9A is a view illustrating an FPCB 600 including one rigid area 640 according to an embodiment of the disclosure when viewed from the rear surface of the electronic device 101 (e.g., in the positive z-axis direction or from the negative z-axis direction (see FIG. 2B)).

Figure 9B:
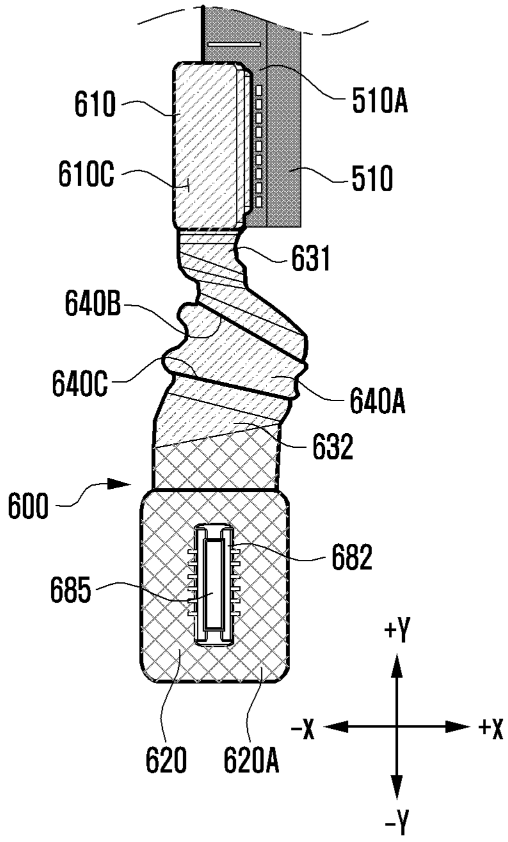

FIG. 9B is a view illustrating the FPCB 600 including the one rigid area 640 according to an embodiment of the disclosure when viewed from the front surface of the electronic device 101 (e.g., in the negative z-axis direction or from the positive z-axis direction (see FIG. 2B)).

Figure 9C:
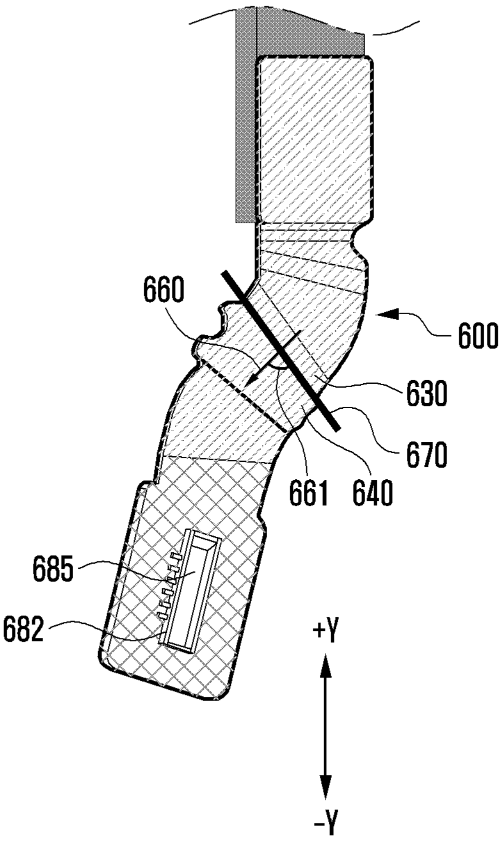

FIG. 9C is a view illustrating the FPCB 600 including the one rigid area 640 according to an embodiment of the disclosure when viewed from an arbitrary direction.

Referring to FIG. 9A, the FPCB 600 according to an embodiment of the disclosure may include a module connection area 610, a board connection area 620, a flexible area 630, and/or a rigid area 640.

The flexible area 630 may include a first flexible area 631 and a second flexible area 632.

Referring to FIG. 9B, in various embodiments, the FPCB 600 may be coupled to the antenna module 500 at a portion of the antenna PCB area 510. For example, the module connection area 610 of the FPCB 600 may be coupled to the antenna module 500 at the one surface 510A of the antenna PCB area 510.

Referring to FIG. 9A, in various embodiments, the antenna PCB area 510 may be coupled to the FPCB 600 at a portion of the module connection area 610. For example, the antenna PCB area 510 may be coupled to the FPCB 600 at the first surface 610A (or the FPCB front surface) of the module connection area 610.

Referring to FIGS. 9A and 9B, the module connection area 610 may be electrically connected to the antenna module 500 at the antenna PCB area 510 to transmit/receive electrical signals to/from the antenna PCB area 510.

The first surface 610A of the module connection area 610 may be parallel to the one surface 510A of the antenna PCB area 510. The one surface 510A of the antenna PCB area 510 may be parallel to the first surface 500A (see FIG. 6B) of the antenna module 500 (see FIG. 6B). The first surface 500A (see FIG. 6B) of the antenna module 500 (see FIG. 6B) may form the first inclined angle 451 (see FIG. 6B) with the support member 311 (see FIG. 6B). Accordingly, the first surface 610A of the module connection area 610 may form the first inclined angle 451 (see FIG. 6B) with the support member 311 (see FIG. 6B).

Within the FPCB 600, the module connection area 610 may be connected to the first flexible area 631 in the third direction (−y-axis direction) with respect to the module connection area 610.

The first flexible area 631 may electrically connect the module connection area 610 to the rigid area 640. In various embodiments, the module connection area 610 may be located in the fourth direction (the y-axis direction) with respect to the first flexible area 631, and the rigid area 640 may be located in the third direction (the −y axis direction) with respect to the first flexible area 631.

In various embodiments, the second surface 610C of the module connection area 610 and the one surface 640A of the rigid area 640 may not be located on the same plane. The first flexible area 631 may have a curved shape rather than a flat shape to connect the module connection area 610 to the rigid area 640. The first flexible area 631 may include a plurality of bent portions therein.

According to an embodiment of the disclosure, the FPCB 600 may include one rigid area 640.

The rigid area 640 may electrically interconnect the first flexible area 631 and the second flexible area 632 to each other. In various embodiments, the first flexible area 631 may be located in the fourth direction (the y-axis direction) with respect to the rigid area 640, and the second flexible area 632 may be located in the third direction (the −y-axis direction) with respect to the rigid area 640.

The rigid area 640 may include one surface 640A, a rigid entry line 640B as a first boundary, and/or a rigid exit line 640C as a second boundary. When the one surface 640A of the rigid area may refer to a surface corresponding to one surface 460A (see FIG. 6C) of the second inclined area 460 (see FIG. 6C) when the rigid area 640 is disposed on the second inclined area 460 (see FIG. 6C). The one surface 640A of the rigid area may have a trapezoidal shape. The rigid entry line 640B may refer to a boundary line dividing the first flexible area 631 and the rigid area 640. The rigid exit line 640C may refer to a boundary line dividing the rigid area 640 and the second flexible area 632.

Functional deterioration of the FPCB 600 may be caused due to noise introduced from a wire (not illustrated) adjacent to the FPCB 600. The rigid area 640 may function to prevent noise from being introduced into the FPCB 600 from the wire (not illustrated) adjacent to the FPCB 600.

The second flexible area 632 may electrically connect the rigid area 640 to the board connection area 620. In various embodiments, the rigid area 640 may be located in the fourth direction (the y-axis direction) with respect to the second flexible area 632, and the board connection area 620 may be located in the third direction (the −y axis direction) with respect to the second flexible area 632.

In various embodiments, the one surface 640A of the rigid area 640 and the one surface 620A of the board connection area 620 may not be located on the same plane. The second flexible area 632 may have a curved shape rather than a flat shape to connect the board connection area 620 to the rigid area 640. The second flexible area 632 may include a plurality of bent portions therein.

The printed circuit board 340 (see FIG. 5) may be connected to the FPCB at the board connection area 620. The board connection area 620 may electrically connect the second flexible area 632 to the printed circuit board 340 (see FIG. 5). In various embodiments, the second flexible area 632 may be located in the fourth direction (the y-axis direction) with respect to the board connection area 620.

In various embodiments, the board connection area 620 may be arranged such that the one surface 620A thereof corresponds to the one surface 470A (see FIG. 6D) of the FPCB support area 470 (see FIG. 6D).

In various embodiments, the module connection area 610, the board connection area 620, the flexible area 630, and the rigid area 640 included in the FPCB 600 may be provided in a plurality of layers inside the FPCB 600.

In various embodiments, a plurality of layers provided in each of the areas 610, 620, 630, and 640 of the FPCB 600 include a conductive layer (not illustrated), a non-conductive layer (not illustrated), and an adhesive layer (not illustrated). The conductive layer (not illustrated) may include a conductive material. For example, the conductive layer (not illustrated) may include copper. The non-conductive layer (not illustrated) may include a non-conductive material. For example, the non-conductive layer (not illustrated) may include polyimide as an insulating material. Each of the areas 610, 620, 630, and 640 of the FPCB 600 may include a copper clad laminate (CCL) containing copper as a conductive material and polyimide as a non-conductive material. The adhesive layer (not illustrated) may perform the function of mutually bonding a plurality of layers provided in each area.

In various embodiments, the rigid area 640 may include a plurality of conductive layers (not illustrated) therein. The rigid area 640 may include more conductive layers (not illustrated) than the flexible area 630. The number of conductive layers (not illustrated) included in the rigid area 640 may be greater than the number of conductive layers (not illustrated) included in the flexible area 630. For example, the flexible area 630 may include one copper clad laminate (CCL), and the rigid area 640 may include two or more copper clad laminates (CCL).

In various embodiments, the module connection area 610 and the board connection area 620 may include a plurality of conductive layers (not illustrated) therein. The number of conductive layers (not illustrated) included in the module connection area 610 and the board connection area 620 may be greater than the number of conductive layers (not illustrated) included in the flexible area 630.

In various embodiments, the flexible area 630 may be bendable. The module connection area 610, the board connection area 620, and the rigid area 640 may have greater rigidity against bending than the flexible area 630. The bending rigidity may refer to a deformation resistance level against a load that can cause bending.

In various embodiments, the FPCB 600 may include wires (not illustrated) therein. For example, the module connection area 610, the board connection area 620, the flexible area 630, and the rigid area 640 of the FPCB 600 may include wires (not illustrated) therein. The antenna module 500 and the printed circuit board 340 may transmit/receive electrical signals therebetween, via the wires (not illustrated).

The wires (not illustrated) may include a signal wire (not illustrated) capable of transmitting/receiving signals to/from an antenna and a power wire (not illustrated) capable of transmitting power to a signal wire.

In various embodiments, the rigid area 640 may include a vertical interconnect access (via) (not illustrated) therein. The rigid area 640 may have a vertical interconnect access (via) (not illustrated) provided around the signal wire (not illustrated) inside the rigid area 640. When a via is provided, the influence of external noise on the signal wire (not illustrated), which passes through the rigid area 640 and transmits the antenna signal, may be reduced.

Referring to FIG. 9C, the electrical connection between the antenna module 500 and the printed circuit board 340 may be made along a wiring direction 660 through a wire (not illustrated) included inside the FPCB 600. For example, the electrical signals generated from the antenna module 500 may be transmitted to the printed circuit board 340 along the wiring direction 660.

Referring to FIG. 9C, in various embodiments, the FPCB 600 may comprise a bending line 670. The bending line 670 may refer to a virtual line substantially parallel to a boundary between the flexible area 630 and the single one of the rigid area 640.

Referring to FIG. 9C, in various embodiments, the wiring direction 660 may form a wiring angle 661 with the bending line 670 formed on the bent surface of the FPCB 600. In an embodiment, the flexible circuit board includes a wire which electrically connects the signal-radiating antenna (e.g., the antenna module 500) and the circuit board (e.g., the PCB 340) to each other and transmits an electrical signal therebetween. A bending line 670 may be parallel to a boundary between the flexible area 630 and the single one of the rigid area, the wire extending along a wiring direction 660 across the boundary between the flexible area and the single one of the rigid area. Here, the wiring direction forms an angle other than 90 degrees with the bending line 670.

When the wiring angle 661 is formed at 90 degrees, the FPCB 600 may extend in the first direction (e.g., the −x-axis direction in FIG. 4) to limit the arrangement position of the camera module 212 (see FIG. 4). Accordingly, in various embodiments, the wiring angle 661 of the FPCB 600 may be an angle other than 90 degrees.

Referring to FIG. 9A, on the x-y plane, the side surface 610B of the module connection area 610 and the side surface 620B of the board connection area 620 may be spaced apart from each other by a ninth length L9 in the first direction (the −x axis direction).

According to various embodiments, the FPCB 600 may include, in at least a portion thereof, connectors 681 (see FIG. 13D) and 682 for electrical connection with an antenna module 500 and a printed circuit board 340 (see FIG. 5). The connectors 681 (see FIG. 13D) and 682 include a first connector 681 (see FIG. 13D) for connection with the antenna module 500 and a second connector 682 for connection with the printed circuit board 340 (see FIG. 5). For example, referring to FIGS. 9B and 9C, the second connector 682 for electrical connection with the printed circuit board 340 (see FIG. 5) may be provided on one surface 620A of the board connection area 620 of the FPCB 600. The second connector 682 may include a coupling groove 685 in which a protruding electrical component can be seated.

Figure 10A:
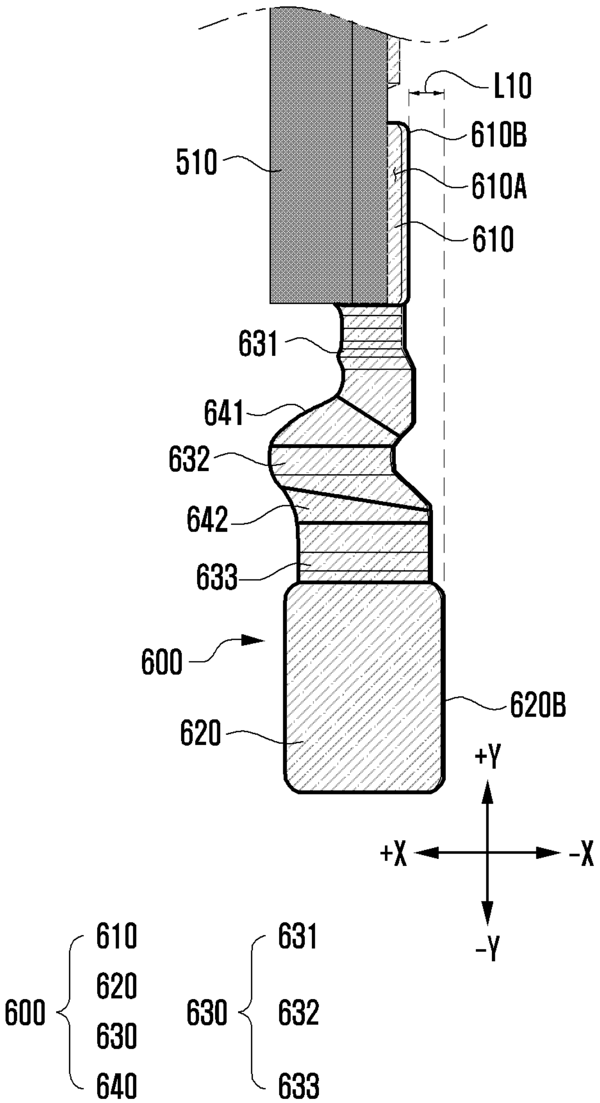
FIGS. 10A, 10B, and 10C are plan views illustrating an FPCB including two rigid areas according to an embodiment of the disclosure.

FIG. 10A is a view illustrating an FPCB 600 including two rigid areas 640 according to an embodiment of the disclosure when viewed from the rear surface of the electronic device 101 (e.g., in the positive z-axis direction (see FIG. 2B)).

Figure 10B:
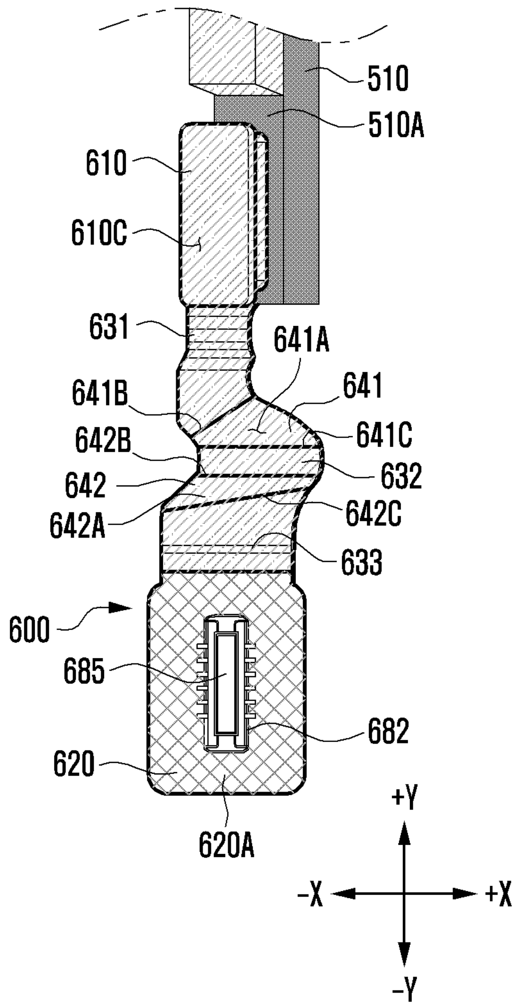

FIG. 10B is a view illustrating the FPCB 600 including the two rigid areas 640 according to an embodiment of the disclosure when viewed from the front surface of the electronic device 101 (e.g., in the negative z-axis direction (see FIG. 2B)).

Figure 10C:
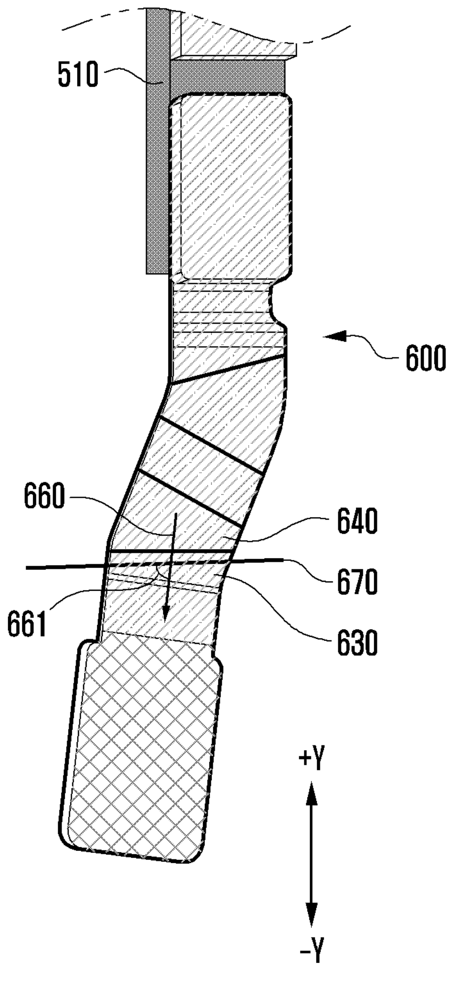

FIG. 10C is a view illustrating the FPCB 600 including the two rigid areas 640 according to an embodiment of the disclosure when viewed from an arbitrary direction.

Referring to FIGS. 10A and 10B, the FPCB 600 according to an embodiment of the disclosure may include a module connection area 610, a board connection area 620, a flexible area 630, and/or a rigid area 640.

The flexible area 630 according to an embodiment of the disclosure may include a first flexible area 631, a second flexible area 632, and/or a third flexible area 633.

According to an embodiment of the disclosure, the FPCB 600 may include two rigid areas 640. For example, the FPCB 600 may include a first rigid area 641 and a second rigid area 642.

Referring to FIG. 10B, in various embodiments, the FPCB 600 may be coupled to the antenna module 500 at a portion of the antenna PCB area 510. For example, the module connection area 610 of the FPCB 600 may be coupled to the antenna module 500 at one surface 510A of the antenna PCB area 510.

Referring to FIG. 10A, in various embodiments, the antenna PCB area 510 may be coupled to the FPCB 600 at a portion of the module connection area 610. The antenna PCB area 510 may be coupled to the first surface 610A of the module connection area 610.

Referring to FIGS. 10A and 10B, the module connection area 610 may be electrically connected to the antenna PCB area 510 to exchange electrical signals with the antenna PCB area 510.

The first surface 610A of the module connection area 610 may be parallel to the one surface 510A of the antenna PCB area 510. The one surface 510A of the antenna PCB area 510 may be parallel to the first surface 500A (see FIG. 6B) of the antenna module 500 (see FIG. 6B). The first surface 500A (see FIG. 6B) of the antenna module 500 (see FIG. 6B) may form the first inclined angle 451 (see FIG. 6B) with the support member 311 (see FIG. 6B). Accordingly, the first surface 610A of the module connection area 610 may form the first inclined angle 451 (see FIG. 6B) with the support member 311 (see FIG. 6B).

The module connection area 610 may be connected to the first flexible area 631 in the third direction (−y-axis direction) with respect to the module connection area 610.

The first flexible area 631 may electrically connect the module connection area 610 to the first rigid area 641. According to an embodiment, the module connection area 610 may be located in the fourth direction (the y-axis direction) with respect to the first flexible area 631, and the first rigid area 641 may be located in the third direction (the −y axis direction) with respect to the first flexible area 631.

In various embodiments, the second surface 610C of the module connection area 610 and the one surface 641A of the first rigid area 641 may not be located on the same plane, that is, not coplanar with each other. The first flexible area 631 may have a curved shape rather than a flat shape to connect the module connection area 610 to the first rigid area 641. The first flexible area 631 may include a plurality of bent portions therein.

The first rigid area 641 may electrically interconnect the first flexible area 631 and the second flexible area 632 to each other. In various embodiments, the first flexible area 631 may be located in the fourth direction (the y-axis direction) with respect to the first rigid area 641, and the second flexible area 632 may be located in the third direction (the −y-axis direction) with respect to the first rigid area 641.

The first rigid area 641 may include a first rigid area surface 641A, a first rigid entry line 641B, and/or a first rigid exit line 641C. The first rigid area surface 641A may have a trapezoidal shape, and may include various shapes without being limited to the trapezoidal shape. The first rigid entry line 641B may refer to a boundary line dividing the first flexible area 631 and the first rigid area 641. The first rigid exit line 641C may refer to a boundary line dividing the first rigid area 641 and the second flexible area 632. The first rigid area 641 may be provided in the state of being disposed and supported on one surface of the inclined area (e.g., the second inclined area 460 in FIG. 6C) (e.g., the one surface 460A of the second inclined area in FIG. 6C), or may be provided in the state of not being supported by a separate member.

Functional deterioration of the FPCB 600 may be caused due to noise introduced from a wire (not illustrated) adjacent to the FPCB 600. The first rigid area 641 may function to prevent noise from being introduced into the FPCB 600 from the wire (not illustrated) adjacent to the FPCB 600.

The second flexible area 632 may electrically interconnect the first rigid area 641 and the second rigid area 642 to each other. According to an embodiment, the first rigid area 641 may be located in the fourth direction (the y-axis direction) with respect to the second flexible area 632, and the second rigid area 642 may be located in the third direction (the −y axis direction) with respect to the second flexible area 632.

In various embodiments, the one surface 641A of the first rigid area 641 may not be located on the same plane as the one surface 642A of the second rigid area 642, that is, located in different planes. The second flexible area 632 may have a curved shape rather than a flat shape to connect the first rigid area 641 to the second rigid area 642. The second flexible area 632 may include a plurality of bent portions therein.

The second rigid area 642 may include one surface 642A, a second rigid entry line 642B, and/or a second rigid exit line 642C. The one surface 642A of the second rigid area 642 may have a trapezoidal shape, and may include various shapes without being limited to the trapezoidal shape. The second rigid entry line 642B may refer to a boundary line dividing the second flexible area 632 and the second rigid area 642. The second rigid exit line 642C may refer to a boundary line dividing the second rigid area 642 and the third flexible area 633. The second rigid area 642 may be provided in the state of being disposed and supported on one surface of the inclined area (e.g., the second inclined area 460 in FIG. 6C) (e.g., the one surface 460A of the second inclined area in FIG. 6C), or may be provided in the state of not being supported by a separate member.

The second rigid area 642 may function to prevent noise from being introduced into the FPCB 600 from the wire (not illustrated) adjacent to the FPCB 600.

One surface 641A (e.g., an outer surface) of the first rigid area 641 and one surface 642A (e.g., an outer surface) of the second rigid area 642 may be parallel to each other. In an embodiment, the surface 641A of the first rigid area 641 and one surface 642A of the second rigid area 642 may be parallel to each other while being disposed in different planes from each other, without being limited thereto. That is, within the FPCB 600 the outer surface of the first rigid area 641 and the outer surface of the second rigid area 642 may be parallel to each other.

The third flexible area 633 may electrically connect the second rigid area 642 to the board connection area 620. According to an embodiment, the second rigid area 642 may be located in the fourth direction (the y-axis direction) with respect to the third flexible area 633, and the board connection area 620 may be located in the third direction (the −y axis direction) with respect to the third flexible area 633.

In various embodiments, the one surface 642A of the second rigid area 642 may not be located on the same plane as the one surface 620A of the board connection area 620. The third flexible area 633 may have a curved shape rather than a flat shape to connect the board connection area 620 to the first rigid area 642. The third flexible area 633 may include a plurality of bent portions therein.

The board connection area 620 may electrically connect the third flexible area 633 to the printed circuit board 340 (see FIG. 5). In various embodiments, the third flexible area 633 may be located in the fourth direction (the y-axis direction) with respect to the board connection area 620.

In various embodiments, the board connection area 620 may be arranged such that the one surface 620A thereof corresponds to the one surface 470A (see FIG. 6D) of the FPCB support area 470 (see FIG. 6D).

Referring to FIG. 10C, in various embodiments, the electrical connection between the antenna module 500 and the printed circuit board 340 may be made along a wiring direction 660 through a wire (not illustrated) included inside the FPCB 600. For example, the electrical signals generated from the antenna module 500 may be transmitted to the printed circuit board 340 along the wiring direction 660.

Referring to FIG. 10C, in various embodiments, the FPCB 600 may comprise a bending line 670. The bending line 670 may refer to a virtual line substantially parallel to a boundary between the flexible area 630 and the single one of the rigid area 640.

Referring to FIG. 10C, in various embodiments, the wiring direction 660 may form a wiring angle 661 with the bending line 670 formed on the bent surface of the FPCB 600. When the wiring angle 661 is formed at 90 degrees, the FPCB 600 may extend in the first direction (e.g., the −x-axis direction in FIG. 4) to limit the arrangement position of the camera module 212 (see FIG. 4). Accordingly, the wiring angle 661 of the FPCB 600 according to an embodiment of the disclosure may be an angle other than 90 degrees.

The FPCB 600 (see FIG. 10A) including two rigid areas 640 according to an embodiment of the disclosure may be reduced in the extension length in the first direction (the −x-axis direction) and thus the positional shift of the camera module 212 (see FIG. 5) in the first direction (the −x-axis direction) may also be reduced.

Referring to FIG. 10A, in the FPCB 600 including two rigid areas 640 according to an embodiment of the disclosure, the side surface 610B of the module connection area 610 may be spaced apart from the side surface 620B of the board connection area 620 by a tenth length L10 in the first direction (the −x-axis direction). The tenth length L10 of the FPCB 600 (see FIG. 10A) including the two rigid areas 640 according to an embodiment of the disclosure may be smaller than the ninth length L9 (see FIG. 9A) of the FPCB 600 (see FIG. 9A) including one rigid area 640 according to an embodiment of the disclosure.

The FPCB 600 (see FIG. 10A) including two rigid areas 640 according to an embodiment of the disclosure may be longer in the entire length than the FPCB 600 (see FIG. 9A) including one rigid area 640 according to an embodiment of the disclosure.

According to various embodiments, the FPCB 600 may include, in at least a portion thereof, connectors 681 (see FIG. 13D) and 682 for electrical connection with an antenna module 500 and a printed circuit board 340 (see FIG. 5). The connectors 681 (see FIG. 13D) and 682 include a first connector 681 (see FIG. 13D) for connection with the antenna module 500 and a second connector 682 for connection with the printed circuit board 340 (see FIG. 5). For example, referring to FIG. 10B, the second connector 682 for electrical connection with the printed circuit board 340 (see FIG. 5) may be provided on one surface 620A of the board connection area 620 of the FPCB 600. The second connector 682 may include a coupling groove 685 in which a protruding electrical component can be seated.

Figure 11A:
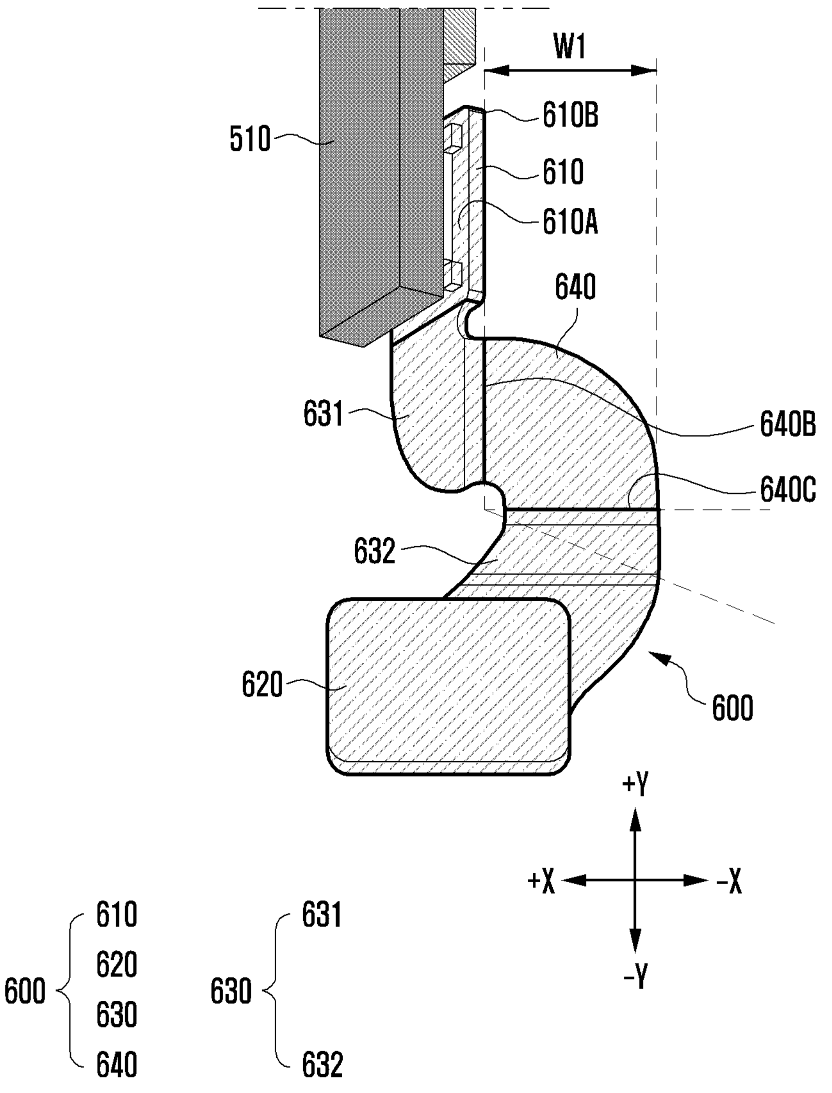
FIGS. 11A and 11B are plan views illustrating an FPCB including one fan-shaped rigid area according to an embodiment of the disclosure.

FIG. 11A is a view illustrating an FPCB 600 including one fan-shaped rigid area 640 according to an embodiment of the disclosure when viewed from the rear surface of the electronic device 101 (e.g., in the positive z-axis direction (see FIG. 2B)).

Figure 11B:
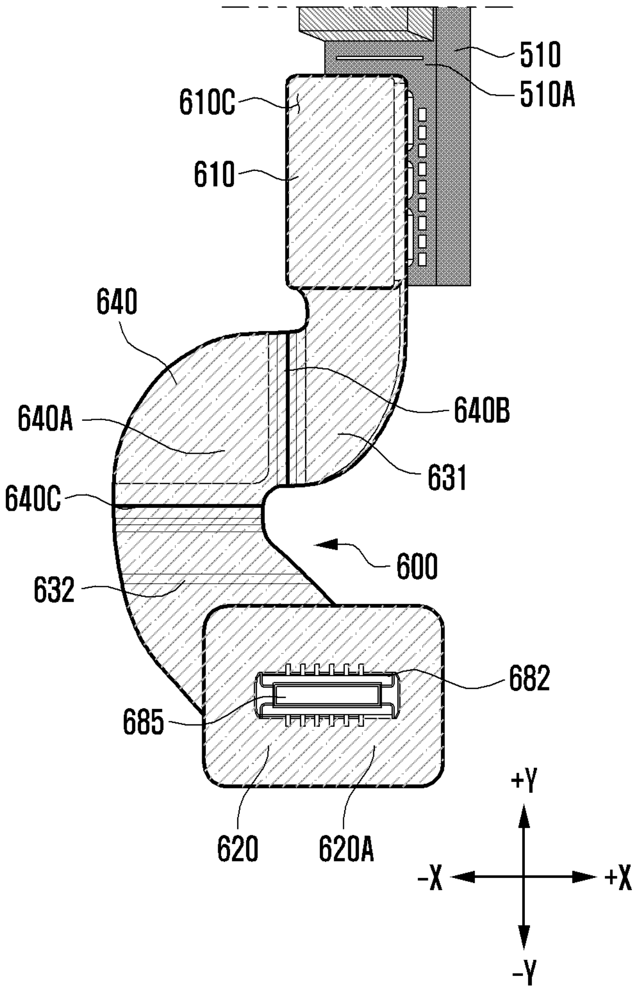

FIG. 11B is a view illustrating the FPCB 600 including the one fan-shaped rigid area 640 according to an embodiment of the disclosure when viewed from the front surface of the electronic device 101 (e.g., in the negative z-axis direction (see FIG. 2B)).

Referring to FIG. 11A, the FPCB 600 according to an embodiment of the disclosure may include a module connection area 610, a board connection area 620, a flexible area 630, and/or a rigid area 640.

The flexible area 630 may include a first flexible area 631 and a second flexible area 632.

Referring to FIG. 11B, in various embodiments, the FPCB 600 may be coupled to the antenna module 500 at a portion of the antenna PCB area 510. For example, the module connection area 610 of the FPCB 600 may be coupled to the antenna module 500 at one surface 510A of the antenna PCB area 510.

Referring to FIG. 11A, in various embodiments, the antenna PCB area 510 may be coupled to the FPCB 600 at a portion of the module connection area 610. For example, the antenna PCB area 510 may be coupled to the FPCB 600 at the first surface 610A of the module connection area 610.

The first surface 610A of the module connection area 610 may be parallel to the one surface 510A of the antenna PCB area 510. The one surface 510A of the antenna PCB area 510 may be parallel to the first surface 500A (see FIG. 6B) of the antenna module 500 (see FIG. 6B). The first surface 500A (see FIG. 6B) of the antenna module 500 (see FIG. 6B) may form the first inclined angle 451 (see FIG. 6B) with the support member 311 (see FIG. 6B). Accordingly, the first surface 610A of the module connection area 610 may form the first inclined angle 451 (see FIG. 6B) with the support member 311 (see FIG. 6B).

Referring to FIGS. 11A and 11B, the module connection area 610 may be electrically connected to the antenna module 500 at the antenna PCB area 510 to exchange electrical signals with the antenna PCB area 510. The module connection area 610 may be connected to the first flexible area 631 in the third direction (−y-axis direction) with respect to the module connection area 610.

The first flexible area 631 may electrically connect the module connection area 610 to the rigid area 640. The module connection area 610 may be located in the fourth direction (the y-axis direction) with respect to the first flexible area 631, and the rigid area 640 may be located in the first direction (the −x axis direction) with respect to the first flexible area 631.

In various embodiments, the second surface 610C of the module connection area 610 may not be located on the same plane as the one surface 640A of the rigid area 640. The first flexible area 631 may have a curved shape rather than a flat shape to connect the module connection area 610 to the rigid area 640. The first flexible area 631 may include a plurality of bent portions therein.

Since the first surface 610A of the module connection area 610 according to an embodiment of the disclosure form the first inclined angle 451 (see FIG. 6B) with the support member 311 (see FIG. 6B), the first flexible area 631 connected in parallel to the module connection area 610 may form, in at least a portion thereof, the first inclined angle 451 (see FIG. 6B) with the support member 311 (see FIG. 6B). According to an embodiment of the disclosure, since the rigid area 640 may be parallel to the support member 311 (see FIG. 6), the first flexible area 631 may be connected to the rigid area 640 while being bent multiple times to offset the first inclined angle 451 (see FIG. 6B).

According to an embodiment of the disclosure, the FPCB 600 may include one rigid area 640. The rigid area 640 may electrically interconnect the first flexible area 631 and the second flexible area 632 to each other. The first flexible area 631 may be located in the first direction (the x-axis direction) with respect to the rigid area 640, and the second flexible area 632 may be located in the third direction (the −y-axis direction) with respect to the rigid area 640.

According to an embodiment of the disclosure, the rigid area 640 may include one surface 640A thereof, a rigid entry line 640B, and/or a rigid exit line 640C. The one surface 640A of the rigid area 640 may have a fan shape. The rigid entry line 640B may be located in the second direction (x-axis direction) with respect to the one surface 640A of the rigid area 640, and the rigid exit line 640C may be located in the third direction (the −y-axis direction) with respect to the one surface 640A of the rigid area 640. The rigid entry line 640B may refer to a boundary line dividing the first flexible area 631 and the rigid area 640. The rigid exit line 640C may refer to a boundary line dividing the rigid area 640 and the second flexible area 632.

The fan-shaped rigid area 640 according to an embodiment of the disclosure may be parallel to the printed circuit board 340 (see FIG. 5). For example, the one surface 640A of the rigid area 640 may be parallel to the one surface of the printed circuit board 340 (see FIG. 5).

The rigid area 640 may be provided parallel to the one surface of the printed circuit board 340 (see FIG. 5) with a spacing therebetween (not illustrated), and the board connection area 620 may be provided parallel to the one surface of the printed circuit board 340 (see FIG. 5) without a spacing (not illustrated) therebetween. The one surface 640A of the rigid area 640 may be spaced apart from the one surface 620A of the board connection area 620 by a spacing (not illustrated). Herein, the spacing may be taken in a direction normal to parallel surfaces or elements, without being limited thereto.

Functional deterioration of the FPCB 600 may be caused due to noise introduced from a wire (not illustrated) adjacent to the FPCB 600. The rigid area 640 may function to prevent noise from being introduced into the FPCB 600 from the wire (not illustrated) adjacent to the FPCB 600.

The second flexible area 632 may electrically connect the rigid area 640 to the board connection area 620.

In an embodiment of the disclosure, the rigid area 640 may be located in the fourth direction (the y-axis direction) with respect to the second flexible area 632, and the board connection area 620 may be located in the second direction (the x-axis direction) and the third direction (the −y axis direction) with respect to the second flexible area 632.

In various embodiments, the one surface 640A of the rigid area 640 and the one surface 620A of the board connection area 620 may not be located on the same plane. The second flexible area 632 may have a curved shape rather than a flat shape to connect the board connection area 620 to the rigid area 640. The second flexible area 632 may include a plurality of bent portions therein.

In various embodiments, the board connection area 620 may electrically connect the second flexible area 632 to the printed circuit board 340. The second flexible area 632 may be located in the first direction (−x-axis direction) and the fourth direction (y-axis direction) of the board connection area 620. The board connection area 620 may be provided parallel to the printed circuit board 340 without a spacing therebetween.

In various embodiments, the electrical connection between the antenna module 500 and the printed circuit board 340 may be made along a wiring direction 660 (see FIG. 9C) through a wire (not illustrated) included inside the FPCB 600. For example, the electrical signals generated from the antenna module 500 may be transmitted to the printed circuit board 340 along the wiring direction 660 (see FIG. 9C).

In various embodiments, the FPCB 600 may comprise a bending line 670 (see FIG. 9C). The bending line 670 (see FIG. 9C) may refer to a virtual line substantially parallel to a boundary between the flexible area 630 (see FIG. 9C) and the single one of the rigid area 640 (see FIG. 9C).

In an embodiment, the rigid entry line 640B and the rigid exit line 640C of the rigid area 640 may form an angle of about 90 degrees relative to each other. In this case, the wiring direction 660 (see FIG. 9C) passing through the rigid area 640 may form an angle of 90 degrees with the bending line 670 (see FIG. 9C).

In another embodiment, the rigid entry line 640B and the rigid exit line 640C of the rigid area 640 may form an angle of 90 degrees. In this case, the wiring direction 660 (see FIG. 9C) passing through the rigid area 640 may form an angle other than 90 degrees with the bending line 670 (see FIG. 9C).

Referring to FIGS. 11A and 11B, the x-axis position of the fan-shaped rigid area 640 according to an embodiment of the disclosure may be provided at a position shifted in the first direction (the −x-axis direction) compared to the x-axis positions of the module connection area 610, the first flexible area 631, and the board connection area 620. For example, according to an embodiment of the disclosure, the rigid area 640 may have a first width W1 in the first direction (the −x-axis direction) from the side surface 610B of the module connection area 610 and the rigid entry line 640B.

The first width W1 of the FPCB 600 (see FIG. 11A) including the fan-shaped rigid area 640 according to an embodiment of the disclosure may be longer than the ninth length L9 (see FIG. 9A) of the FPCB 600 (see FIG. 9A) including one rigid area 640 according to an embodiment of the disclosure, and the tenth length L10 (see FIG. 10A) of the FPCB 600 (see FIG. 10A) including two rigid area 640.

According to various embodiments, the FPCB 600 may include, in at least a portion thereof, connectors 681 (see FIG. 13D) and 682 for electrical connection with an antenna module 500 and a printed circuit board 340 (see FIG. 5). The connectors 681 (see FIG. 13D) and 682 include a first connector 681 (see FIG. 13D) for connection with the antenna module 500 and a second connector 682 for connection with the printed circuit board 340. For example, referring to FIG. 11B, the second connector 682 for electrical connection with the printed circuit board 340 (see FIG. 5) may be provided on one surface 620A of the board connection area 620 of the FPCB 600. The second connector 682 may include a coupling groove 685 in which a protruding electrical component can be seated.

Figure 12A:
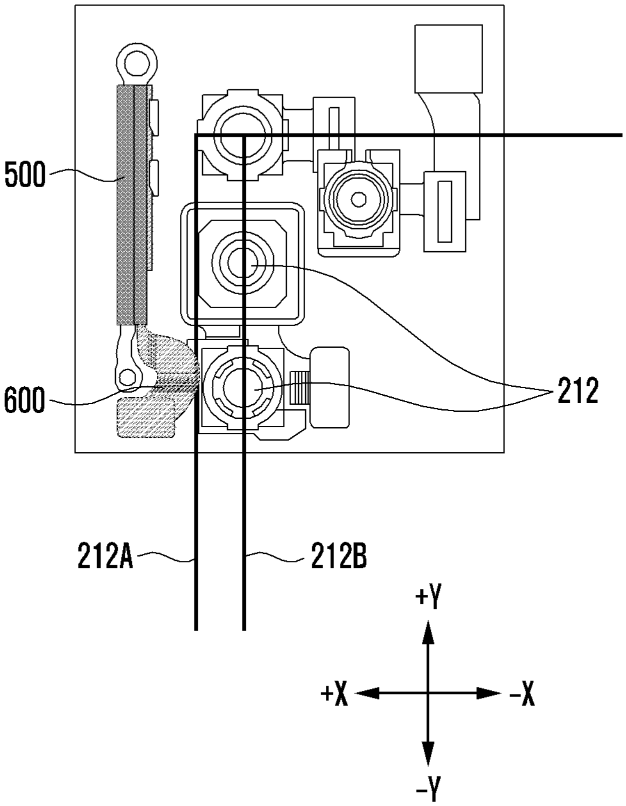
FIGS. 12A and 12B are plan views illustrating an arrangement position of camera modules according to an arrangement of an antenna module according to an embodiment of the disclosure.

FIG. 12A is a view illustrating positions of the camera modules 212 inside the electronic device 101 according to an embodiment of the disclosure.

Figure 12B:
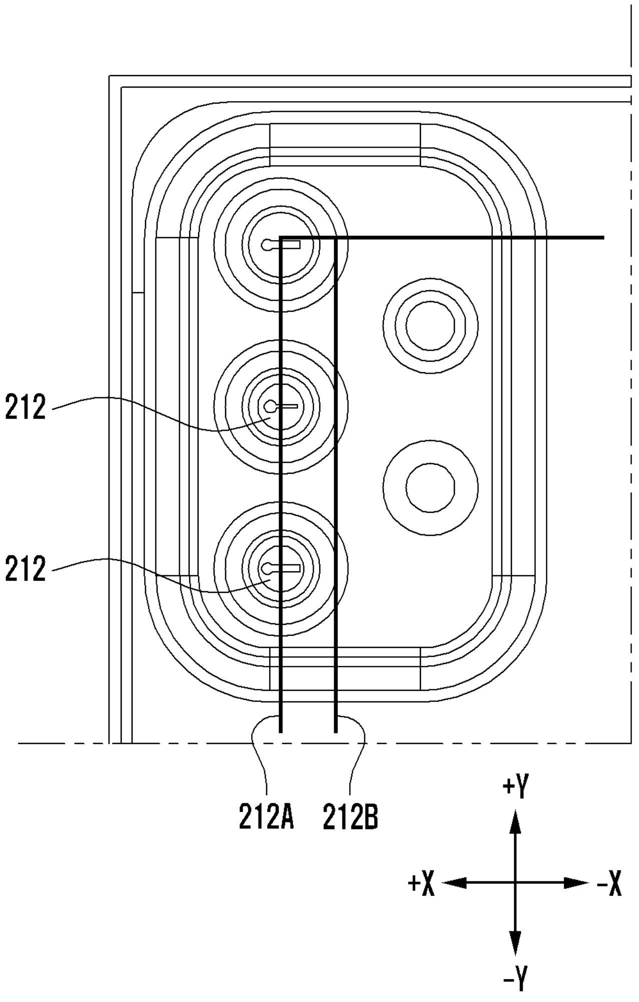

FIG. 12B is a view illustrating positions of the camera modules 212 on the rear surface of the electronic device 101 (e.g., the second surface 210B (see FIG. 2B) of the housing 210 (see FIG. 2)) according to an embodiment of the disclosure.

Referring to FIG. 12A, in various embodiments, the antenna module 500 and the FPCB 600 may be located in the second direction (the x-axis direction) with respect to the camera modules 212.

In various embodiments, the FPCB 600 may be provided at a position shifted in the third direction (the −y-axis direction) from the arrangement position of the antenna module 500. In some embodiments, the FPCB 600 may be formed at a position shifted not only in the third direction (the −y-axis direction) but also in the first direction (the −x-axis direction) from the arrangement position of the antenna module 500. For example, referring to FIG. 11A, in the embodiment in which the FPCB 600 includes a fan-shaped rigid area 640, the rigid area 640 may be provided at a position shifted in the first direction (the −x-axis direction) compared to those in other embodiments (see FIGS. 9A and 10A).

When the position where the FPCB 600 is provided is shifted in the first direction (the −x-axis direction), the space in which the camera module 212 can be placed is restricted, so that the camera module 212 may also be shifted in the first direction (the −x-axis direction).

Referring to FIGS. 12A and 12B, in the case of the embodiment in which the FPCB 600 includes a fan-shaped rigid area 640 (see FIG. 11A), the second arrangement reference line 212B of the camera modules 212 after the FPCB 600 is arranged may be shifted in the first direction (the −x-axis direction) compared the first arrangement reference line 212A of the camera modules 212 before the FPCB 600 is arranged.

Figure 13A:
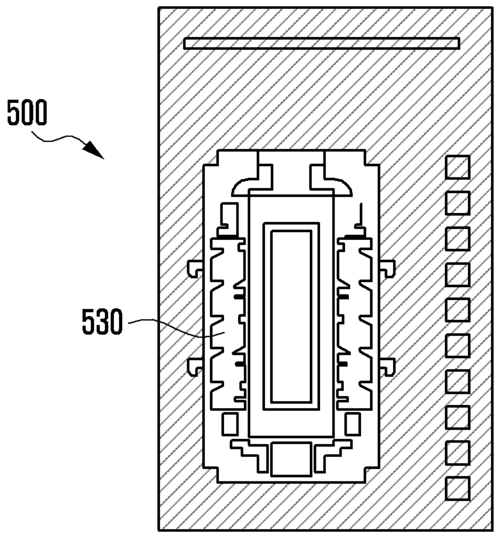
FIGS. 13A, 13B, 13C, 13D, 13E, and 13F are views illustrating an antenna connector, a first connector, and a second connector according to various embodiments of the disclosure.

FIG. 13A is a plan view illustrating an antenna connector 530 provided in the antenna module 500 according to various embodiments of the disclosure.

Figure 13B:
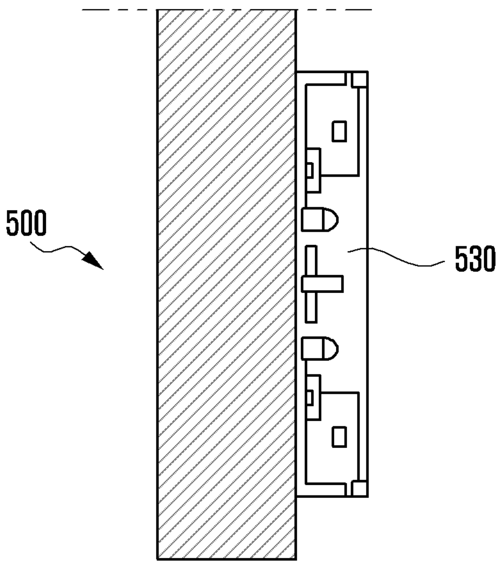

FIG. 13B is a side view illustrating the antenna connector 530 provided in the antenna module 500 according to various embodiments of the disclosure.

Figure 13C:
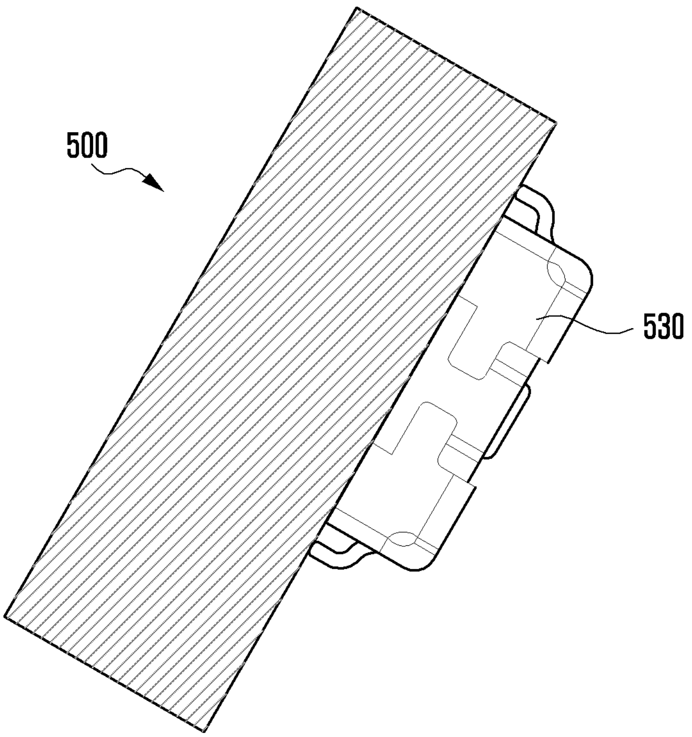

FIG. 13C is a view illustrating the antenna connector 530 provided on the antenna module 500 arranged with the first inclined angle 451 (see FIG. 6B) according to various embodiments of the disclosure. That is, the antenna connector 530 may be provided on the antenna PCB area 510 arranged at the first inclined angle 451.

Figure 13D:
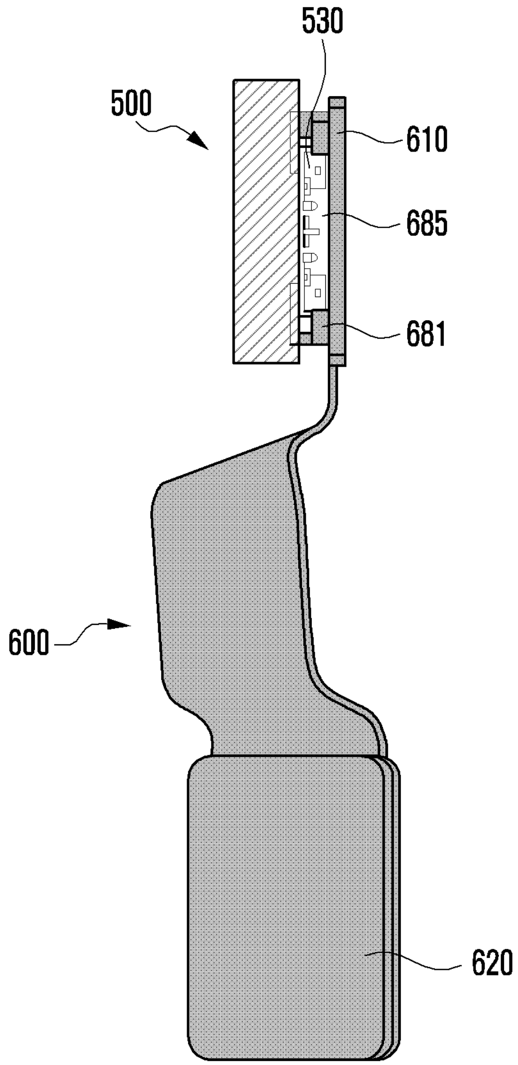

FIG. 13D is a view illustrating the coupling between the antenna connector 530 and the first connector 681 of the FPCB 600 according to various embodiments of the disclosure.

Figure 13E:
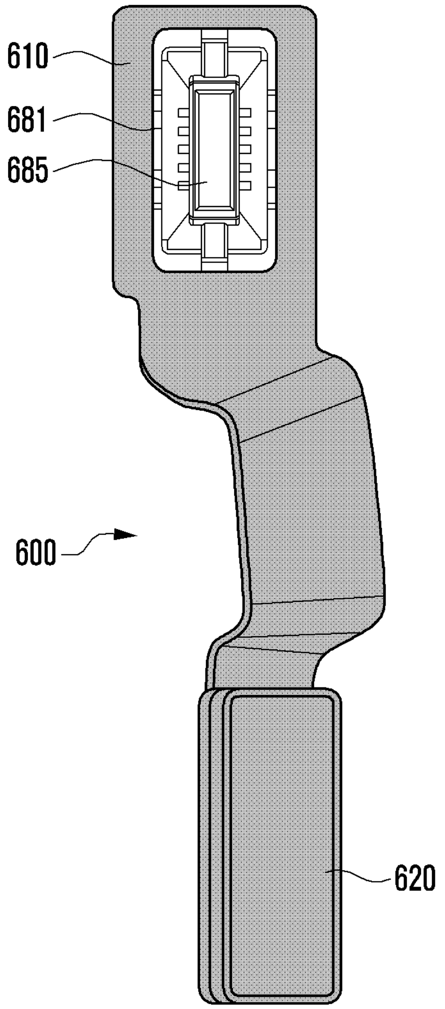

FIG. 13E is a view illustrating the first connector 681 of the FPCB 600 according to various embodiments of the disclosure.

Figure 13F:
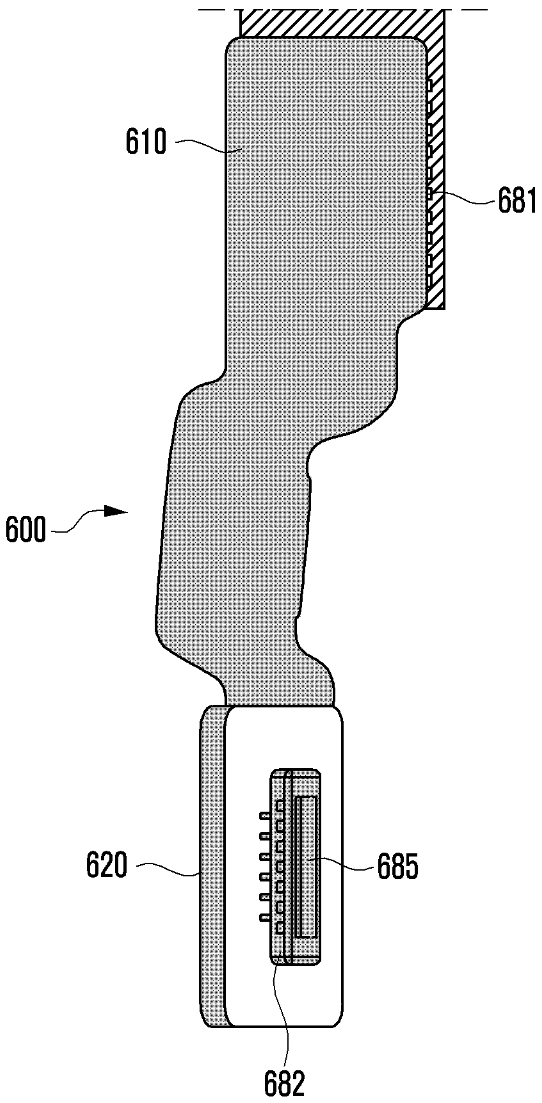

FIG. 13F is a view illustrating an arrangement of the first connector 681 and the second connector 682 of the FPCB 600 according to various embodiments of the disclosure.

Referring to FIGS. 13A, 13B, and 13C, the antenna module 500 may have an antenna connector 530 provided on one surface thereof. The antenna connector 530 may protrude from the one surface of the antenna module 500.

Referring to FIG. 13D, the antenna module 500 and the FPCB 600 according to various embodiments of the disclosure may be electrically connected to each other via the antenna connector 530 provided on the antenna module 500 coupled with the first connector 681 provided on the FPCB 600.

Referring to FIGS. 13D, 13E, and 13F, the FPCB 600 according to various embodiments of the disclosure may include, in at least a portion thereof, first and second connectors 681 and 682 for electrical connection with the antenna module 500 and a printed circuit board 340 (see FIG. 5), respectively. The first and second connectors 681 and 682 may include a first connector 681 at which the FPCB 600 is connected to the antenna module 500 and a second connector 682 at which the FPCB 600 is connected to the printed circuit board 340 (see FIG. 5).

Referring to FIGS. 13D, 13E, and 13F, the first connector 681 and the second connector 682 may each include a coupling groove 685 for respective coupling with the antenna module 500 and the printed circuit board 340 (see FIG. 5).

According to various embodiments, the antenna connector 530 of the antenna module 500 and the first connector 681 of the FPCB 600 may have shapes that correspond to each other. The antenna connector 530 which protrudes from the one surface of the antenna module 500, may be inserted into the coupling groove 685 of the first connector 681 in which a protruding electrical component can be seated. The antenna connector 530 inserted into the coupling groove 685 of the first connector 681 electrically connects the antenna module 500 to the FPCB 600.

According to various embodiments of the disclosure, the second connector 682 of the FPCB 600 and a board connector (not illustrated) of the printed circuit board 340 may have shapes that correspond to each other. The board connector (not illustrated) refers to a component provided at a portion of the one surface 470A (see FIG. 6D) of the FPCB support area 470 (see FIG. 6D), which is connected to the second connector 682, to interconnect the printed circuit board 340 (see FIG. 5) and the FPCB (600). The second connector 682 may include a coupling groove 685 in which a protruding electrical component can be seated. The board connector (not illustrated) may protrude from the one surface 470A (FIG. 6D) of the FPCB support area 470 (FIG. 6D). The board connector (not illustrated) inserted into the coupling groove 685 of the second connector 682 electrically interconnect the printed circuit board 340 (see FIG. 5) and the FPCB 600 to each other.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices according to embodiments of the disclosure are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., module or program) of the above-described components may include a singular or a plurality of entities, and some of the plurality of entities may be separately disposed in any other component. According to various embodiments, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly, or heuristically, or one or more of the operations may be executed in a different order or omitted, or one or more other operations may be added.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

What is claimed is:

1. An electronic device comprising:

a housing comprising a support member and a lateral member which extends from the support member and defines a side surface of the housing;

a circuit board which is on the support member and comprises a camera spaced apart from the side surface;

a signal-radiating antenna which is on the support member and electrically connected to the circuit board; and a flexible circuit board which is on the support member and electrically connects the circuit board to the signal-radiating antenna, the flexible circuit board comprising a flexible area and a rigid area having less flexibility than the flexible area, wherein the support member further defines:

a first inclined surface between the side surface and the camera and on which the signal-radiating antenna is disposed, the first inclined surface forming a first inclined angle with respect to one surface of the support member; and a flexible circuit board support surface adjacent to the first inclined surface along a length of the side surface and along which a length of the flexible circuit board extends, the flexible circuit board support surface forming a second inclined angle with respect to the one surface of the support member.

2. The electronic device of claim 1, further comprising a flexible circuit antenna extended between the side surface of the housing and the signal-radiating antenna,
wherein
the signal-radiating antenna radiates signals in a radiation direction towards the side surface of the housing, and
the radiation direction does not intersect the flexible circuit antenna which is extended between the side surface of the housing and the signal-radiating antenna.

3. The electronic device of claim 1, further comprising a side surface volume-control key spaced apart from the signal-radiating antenna along the length of the side surface of the housing.

4. The electronic device of claim 1, wherein within the flexible circuit board:
each of the flexible area and the rigid area comprises a number of conductive layers, and
the number of conductive layers in the rigid area is greater than the number of conductive layers in the flexible area.

5. The electronic device of claim 1, wherein the flexible circuit board comprises a single one of the rigid area.

6. The electronic device of claim 5, wherein the flexible circuit board comprises:
a wire which electrically connects the signal-radiating antenna and the circuit board to each other and transmits an electrical signal therebetween,
a bending line parallel to a boundary between the flexible area and the single one of the rigid area,
the wire extending along a wiring direction across the boundary between the flexible area and the single one of the rigid area, and
the wiring direction forming an angle other than 90 degrees with the bending line.

7. The electronic device of claim 5, wherein
the support member further defines the first inclined surface, a second inclined surface and the flexible circuit board support surface in order along the length of the side surface, and
the single one rigid area is on the second inclined surface of the support member.

8. The electronic device of claim 7, wherein the second inclined surface forms a third inclined angle with respect to one surface of the support member.

9. The electronic device of claim 1, wherein the flexible circuit board comprises the rigid area provided in plural including two rigid areas.

10. The electronic device of claim 9, wherein flexible circuit board comprises:
a wire which electrically connects the signal-radiating antenna and the circuit board to each other and transmits an electrical signal therebetween,
a bending line parallel to a boundary between the flexible area and one rigid area among the two rigid areas,
the wire extending along a wiring direction across the boundary between the flexible area and the one rigid area, and
the wiring direction forming an angle other than 90 degrees with the bending line.

11. The electronic device of claim 9, wherein within the flexible circuit board:
the two rigid areas comprise a first rigid area and a second rigid area connected to each other by the flexible area, and
an outer surface of the first rigid area and an outer surface of the second rigid area are parallel to each other.

12. The electronic device of claim 1, wherein within the flexible circuit board, the rigid area forms a boundary with the flexible area.

13. The electronic device of claim 12, wherein
the rigid area forms a first boundary and a second boundary with the flexible area, and
the first boundary forms an angle of about 90 degrees with the second boundary.

14. The electronic device of claim 1, wherein along the support member, in a direction perpendicular to the length of the side surface, each of the signal-radiating antenna and the flexible circuit board are between the side surface of the housing and the camera of the circuit board.

15. The electronic device of claim 14, further comprising a flexible circuit antenna extended between the side surface of the housing and the signal-radiating antenna,
wherein
the signal-radiating antenna radiates signals in a radiation direction towards the side surface of the housing, and
the radiation direction does not intersect the flexible circuit antenna which is extended between the side surface of the housing and the signal-radiating antenna.

16. The electronic device of claim 1, wherein
the housing further comprises a side surface portion extended from the side surface in a direction crossing the length of the side surface, and
each of the camera of the circuit board, the signal-radiating antenna and the flexible circuit board are spaced apart from both the side surface and the side surface portion of the housing.

17. The electronic device of claim 16, further comprising a flexible circuit antenna extended between the signal-radiating antenna and the side surface and between the signal-radiating antenna and the side surface portion,
wherein
the signal-radiating antenna radiates signals in a radiation direction towards the side surface of the housing, and
the radiation direction does not intersect the flexible circuit antenna which is extended between the side surface of the housing and the signal-radiating antenna.

18. An electronic device comprising:
a housing comprising a support member and a lateral member which extends from the support member and defines a side surface of the housing;
a circuit board which is on the support member and comprises a camera spaced apart from the side surface;
a signal-radiating antenna which is on the support member and electrically connected to the circuit board; and
a flexible circuit board which is on the support member and electrically connects the circuit board to the signal-radiating antenna, the flexible circuit board comprising:
a flexible area and a rigid area having less flexibility than the flexible area, and
a connector at which the flexible circuit board is electrically connected with the circuit board and the signal-radiating antenna,
wherein the support member further defines:
a first inclined surface between the side surface and the camera and on which the signal-radiating antenna is disposed, the first inclined surface forming a first inclined angle with respect to one surface of the support member; and
a flexible circuit board support surface adjacent to the first inclined surface along a length of the side surface and along which a length of the flexible circuit board extends, the flexible circuit board support surface forming a second inclined angle with respect to the one surface of the support member.

19. The electronic device of claim 18, wherein the connector of the flexible circuit board is provided in plural including:

a first connector at which the flexible circuit board is electrically connected with the signal-radiating antenna, and a second connector at which the flexible circuit board is electrically connected with the circuit board, and each of the first connector and the second connector comprises a coupling groove in which the signal-radiating antenna and the circuit board are respectively inserted.

20. The electronic device of claim 19, further comprising a flexible circuit antenna extended between the side surface of the housing and the signal-radiating antenna, wherein the signal-radiating antenna radiates signals in a radiation direction towards the side surface of the housing, and the radiation direction does not intersect the flexible circuit antenna which is extended between the side surface of the housing and the signal-radiating antenna.

* * * * *